US012730407B2

(12) United States Patent
Hamada et al.

(10) Patent No.: US 12,730,407 B2
(45) Date of Patent: Sep. 8, 2026

(54) ROLLER HOLDING UNIT, CARTRIDGE AND IMAGE FORMING APPARATUS

(71) Applicant: CANON KABUSHIKI KAISHA, Tokyo (JP)

(72) Inventors: Takatoshi Hamada, Shizuoka (JP); Hiroki Shimizu, Shizuoka (JP); Yusuke Atsu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/082,430

(22) Filed: Mar. 18, 2025

(65) Prior Publication Data

US 2025/0306527 A1 Oct. 2, 2025

(30) Foreign Application Priority Data

Mar. 29, 2024 (JP) ................................ 2024-057904

(51) Int. Cl.
*G03G 21/16* (2006.01)
*G03G 21/18* (2006.01)

(52) U.S. Cl.
CPC ....... *G03G 21/181* (2013.01); *G03G 21/1814* (2013.01); *G03G 21/1821* (2013.01); *G03G 21/1828* (2013.01)

(58) Field of Classification Search
USPC .......................................... 399/107, 110, 111
See application file for complete search history.

(56) References Cited

U.S. PATENT DOCUMENTS 9,069,312 B2 * 6/2015 Kanai .................... G03G 15/50
9,632,479 B2 4/2017 Maeshima et al.
9,778,616 B2 10/2017 Hiramatsu et al.
10,007,225 B2 6/2018 Nosho et al.
(Continued)

FOREIGN PATENT DOCUMENTS

JP 2005077441 A * 3/2005 ............ G03G 21/18
JP 2006-220875 A 8/2006
(Continued)

OTHER PUBLICATIONS

Co-Pending U.S. Appl. No. 19/066,550, filed Feb. 28, 2025.
Co-Pending U.S. Appl. No. 19/090,695, filed Mar. 26, 2025.
Co-Pending U.S. Appl. No. 19/090,717, filed Mar. 26, 2025.

*Primary Examiner* — Hoan H Tran
(74) *Attorney, Agent, or Firm* — Venable LLP

(57) ABSTRACT

A roller member, a bearing member supporting a shaft portion of the roller member and movable in a first direction perpendicular to a rotation axis of the shaft portion, a first biasing member for biasing the bearing member in the first direction, a first regulating member regulating movement of the bearing member from a first position in the first direction, a separating member rotatable around the shaft portion, a second biasing member for biasing the separating member in a second direction, which is a rotating direction around the shaft portion, and a second regulating member regulating rotation of the separating member in the second direction are provided. The separating member has a cylinder portion attached to an end part in an axial direction of the shaft portion and a projecting portion projecting in a radial direction of the shaft portion from the cylinder portion.

15 Claims, 18 Drawing Sheets

(56) References Cited

U.S. PATENT DOCUMENTS

| | | | |
|---|---|---|---|
| 10,025,217 | B2 | 7/2018 | Kimura et al. |
| 10,095,180 | B2 | 10/2018 | Harada et al. |
| 10,698,361 | B2 | 6/2020 | Maeshima et al. |
| 10,712,707 | B2 | 7/2020 | Maeshima et al. |
| 10,732,545 | B2 | 8/2020 | Takeuchi et al. |
| 11,016,440 | B2 | 5/2021 | Kawamura et al. |
| 11,073,787 | B2 | 7/2021 | Maeshima et al. |
| 11,392,079 | B2 | 7/2022 | Maeshima et al. |
| 11,982,952 | B2 | 5/2024 | Asanuma et al. |
| 2016/0252878 | A1 | 9/2016 | Kimura et al. |
| 2023/0032591 | A1 | 2/2023 | Murakami et al. |
| 2023/0367239 | A1 | 11/2023 | Asanuma et al. |

FOREIGN PATENT DOCUMENTS

| | | | |
|---|---|---|---|
| JP | 2013-148629 | A | 8/2013 |
| JP | 2016-161659 | A | 9/2016 |
| JP | 2022-084516 | A | 6/2022 |

* cited by examiner

ROLLER HOLDING UNIT, CARTRIDGE AND IMAGE FORMING APPARATUS

BACKGROUND OF THE INVENTION

Field of the Invention

The present invention relates to a roller holding unit, a cartridge, and an image forming apparatus.

Description of the Related Art

In an image forming apparatus by electrophotography, rollers such as a development roller, a charging roller, a transfer roller and the like are brought into contact with a photosensitive drum at the time of image formation. During a period from product shipment of the image forming apparatus to start of use of the image forming apparatus by a user, if another roller member is continuously in contact with the photosensitive drum, a contact trace remains on a surface of the roller, which might affect images.

In order to prevent the above, following measures can be considered. That is, by fitting a separating member with a shaft portion of another roller and by causing the separating member to abut against the photosensitive drum, another roller is held so that the photosensitive drum is not brought into contact with another roller during the period until the start of the use. Then, by releasing the abutted state of the separating member at the start of the use, the photosensitive drum and another roller are brought into contact with each other. When a product using the separating member as above is to be assembled, while the roller is held and until the photosensitive drum is assembled to the roller holding unit to which the photosensitive drum is assembled, an abutted part of the separating member needs to be held toward the photosensitive drum.

In Japanese Patent Application Publication No. 2022-84516, such a constitution is proposed that an arc-shaped recess surface is provided on a side opposite to a side facing the photosensitive drum in the separating member fitted in the charging roller brought into contact with the photosensitive drum, and the recess surface of the separating member is brought into contact with a shaft surface of another roller biased by the charging roller. As a result, it is configured such that, even before the photosensitive drum is assembled, the abutted part of the separating member can be held toward the photosensitive drum by another roller biased by the charging roller.

As in Japanese Patent Application Publication No. 2022-84516, in a case of such a constitution that still another component is biased to the roller brought into contact with the photosensitive drum, it was possible to hold the separating member by using a biasing force of still another component. However, in a case of such a constitution that still another component is not biased to the roller brought into contact with the photosensitive drum, it was necessary to perform assembling while holding the separating member by a worker, a device or the like at the assembling.

SUMMARY OF THE INVENTION

The present invention provides, in an assembling process of assembling a photosensitive drum to a roller holding unit, an art which enables holding of an attitude of a separating member toward the photosensitive drum in a state before the photosensitive drum is assembled.

The present invention is a roller holding unit, when a photosensitive drum is assembled thereto, forming a part of an image forming apparatus or a part of a cartridge detachably attached to an apparatus main body of an image forming apparatus, comprising:

a frame body;

a roller member having a shaft portion and rotating in a state in contact with the photosensitive drum at image formation;

a bearing member rotatably supporting the shaft portion and held by the frame body movably in a first direction perpendicular to a rotation axis of the shaft portion; a first biasing member for biasing the bearing member in the first direction with respect to the frame body;

a first regulating member configured to regulate movement of the bearing member in the first direction from a first position, the first position being a position where the bearing member is positioned in a state where the photosensitive drum is not assembled to the roller holding unit;

a separating member rotatable around the shaft portion;

a second biasing member configured to bias the separating member in a second direction, which is a rotating direction around the shaft portion, with respect to the frame body; and a second regulating member configured to regulate rotation of the separating member in the second direction, wherein the separating member has a cylinder portion attached to an end part in an axial direction of the shaft portion and a projecting portion projecting in a radial direction of the shaft portion from the cylinder portion.

The present invention is an image forming apparatus, comprising:

a frame body;

a photosensitive drum;

a roller member having a shaft portion and rotating in a state in contact with the photosensitive drum at image formation;

a bearing member rotatably supporting the shaft portion and held by the frame body movably in a direction in which a distance between the bearing member and the photosensitive drum changes;

a first biasing member for biasing the bearing member in a first direction with respect to the frame body, the first direction being a direction in which the bearing member approaches the photosensitive drum;

a first regulating member configured to regulate movement of the bearing member in the first direction from a first position, the first position being a position where the bearing member is positioned in a state where the photosensitive drum is not assembled to the image forming apparatus;

a separating member rotatable around the shaft portion;

a second biasing member configured to bias the separating member in a second direction, which is a rotating direction around the shaft portion, with respect to the frame body; and a second regulating member configured to regulate rotation of the separating member in the second direction, wherein the separating member has a cylinder portion attached to an end part in an axial direction of the shaft portion and a projecting portion projecting in a radial direction of the shaft portion from the cylinder portion.

The present invention is a cartridge configured to be detachably attached to an apparatus main body of an image forming apparatus, comprising:

a frame body;

a photosensitive drum;

a roller member having a shaft portion and rotating in a state in contact with the photosensitive drum at image formation;

a bearing member rotatably supporting the shaft portion and held by the frame body movably in a direction in which a distance between the bearing member and the photosensitive drum changes;

a first biasing member for biasing the bearing member in a first direction with respect to the frame body, the first direction being a direction in which the bearing member approaches the photosensitive drum;

a first regulating member configured to regulate movement of the bearing member in the first direction from a first position, the first position being a position where the bearing member is positioned in a state where the photosensitive drum is not assembled to the cartridge;

a separating member rotatable around the shaft portion;

a second biasing member configured to bias the separating member in a second direction, which is a rotating direction around the shaft portion, with respect to the frame body; and a second regulating member configured to regulate rotation of the separating member in the second direction, wherein the separating member has a cylinder portion attached to an end part in an axial direction of the shaft portion and a projecting portion projecting in a radial direction of the shaft portion from the cylinder portion.

Further features of the present invention will become apparent from the following description of exemplary embodiments with reference to the attached drawings.

DESCRIPTION OF THE EMBODIMENTS

In the following, with reference to drawings and Embodiments, a preferred embodiment for embodying the present invention will be explained in an exemplifiable manner in detail. However, functions, materials, shapes, dimensions, relative dispositions and the like of components described in the Embodiments can be changed as appropriate depending on a constitution, various conditions and the like of an apparatus to which the invention is applied. Unless specifically described, the range of the present invention is not intended to be limited to them.

Embodiment 1

Hereinafter, the Embodiment 1 of the present invention will be explained by using drawings. In the Embodiment 1, as an image forming apparatus, an image forming apparatus to which four process cartridges can be detachably attached is exemplified. Note that the number of process cartridges to be attached to the image forming apparatus is not limited to the above. It can be set as necessary as appropriate.

In addition, in the Embodiments described below, a laser-beam printer is exemplified as one aspect of an image forming apparatus.

Schematic Constitution of Image Forming Apparatus

Figure 2:
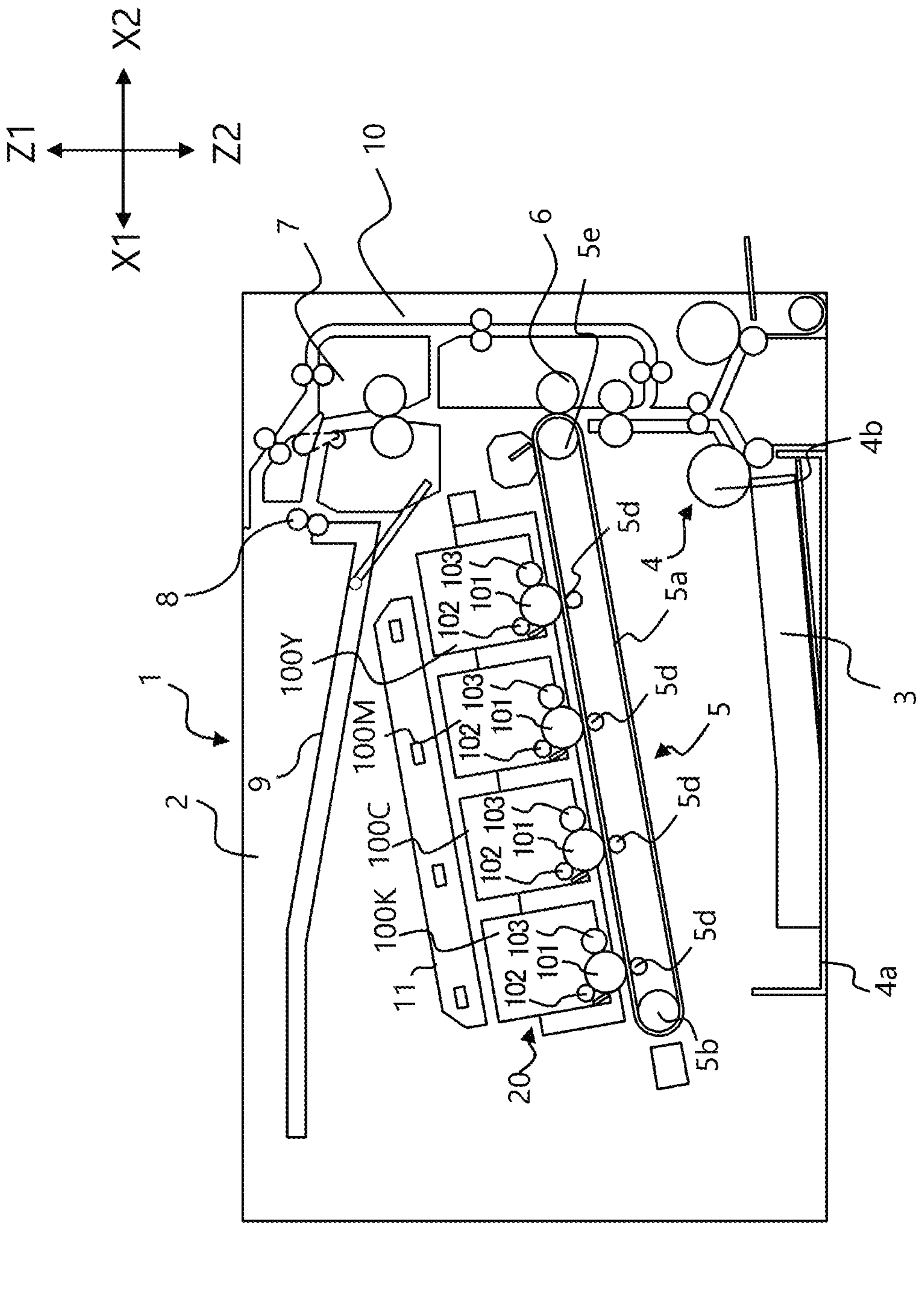
FIG. 2 is a schematic sectional diagram of an image forming apparatus of the Embodiment 1.
Figure 3:
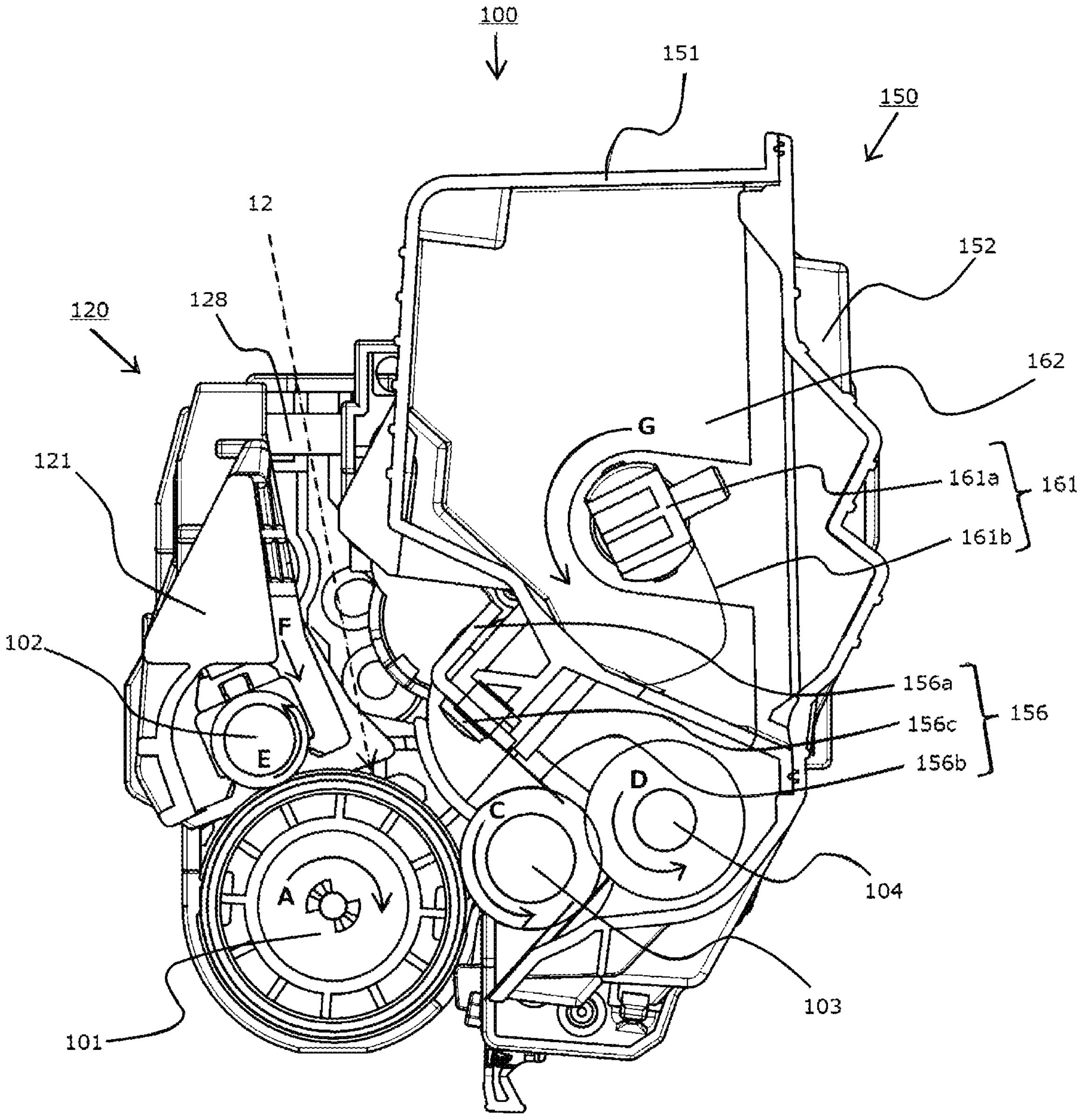
FIG. 3 is a sectional view of a process cartridge of the Embodiment 1.

An entire constitution of an image forming apparatus 1 of an electrophotographic form according to the Embodiment 1 will be explained by using FIG. 2. FIG. 2 is a schematic sectional diagram of the image forming apparatus 1. In addition, FIG. 3 is a sectional view of the process cartridge 100.

This image forming apparatus 1 is a four full-color laser-beam printer using an electrophotographic process and performs color image-forming on a recording medium 3. The image forming apparatus 1 is a process-cartridge type and forms a color image on the recording medium 3 by detachably attaching the process cartridge 100 to an apparatus main body 2.

Here, regarding the image forming apparatus 1, a side on which a front door 10 is provided is referred to as a front (front surface), and a surface opposite to the front surface to be a rear (back surface). In addition, a right side when viewing the image forming apparatus 1 from the front surface is referred to as a driving side, a left side as a non-driving side, an upper side as an upper surface, and a lower side as a lower surface. FIG. 2 is a sectional view when viewing the image forming apparatus 1 from the non-driving side, and a front on the paper surface is the non-driving side of the image forming apparatus 1, a right side on the paper surface as the front surface of the image forming apparatus 1, and a depth side of the paper surface as the driving side of the image forming apparatus 1.

The driving side of the process cartridge 100 is a side on which a drum-coupling member (photosensitive-body coupling member), which will be described later, is disposed when viewed in an axis direction of the photosensitive drum

101. When viewed in a (development member) axis direction of a development roller 103, it is a side on which a development coupling member, which will be described later, is disposed.

In the apparatus main body 2, the first to fourth process cartridges 100 (100Y, 100M, 100C, 100K) are disposed substantially in a horizontal direction.

The first to fourth process cartridges 100 (100Y, 100M, 100C, 100K) have similar electrophotographic process mechanisms, respectively, and colors and filled amounts of each of developers (hereinafter, referred to as a toner) are different. Therefore, in the following, when they do not have to be distinguished in particular, suffixes Y to K are omitted and explained comprehensively.

To the first to fourth process cartridges 100, a rotation driving force is transmitted from a drive-output portion (details will be described later) of the apparatus main body 2, and bias voltages (charging bias, developing bias, electrostatic residual-quantity detection bias and the like) are supplied from a contact of the apparatus main body 2 (not shown).

As shown in FIG. 3, the process cartridge 100 of the Embodiment 1 has a charging unit 120 including a photosensitive drum 101 as an image bearing body and charging means as process means acting on this photosensitive drum 101. Here, the charging unit 120 may have not only the charging means as process means but cleaning means in some cases.

In addition, the process cartridge 100 has a development unit 150 including development means for developing an electrostatic latent image on the photosensitive drum 101.

The charging unit 120 and the development unit 150 are connected to each other. More specific constitution of the process cartridge 100 will be described later.

The first process cartridge 100Y stores a toner in yellow (Y) in a development frame-body and forms a toner image in yellow color on the surface of the photosensitive drum 101.

The second process cartridge 100M stores a toner in magenta (M) in a development frame-body and forms a toner image in magenta color on the surface of the photosensitive drum 101.

The third process cartridge 100C stores a toner in cyan (C) in a development frame-body and forms a toner image in cyan color on the surface of the photosensitive drum 101.

The fourth process cartridge 100K stores a toner in black (K) in a development frame-body and forms a toner image in black color on the surface of the photosensitive drum 101.

Above the first to fourth process cartridges 100, a laser scanner unit 11 as exposing means is provided. This laser scanner unit 11 outputs a laser beam 12 corresponding to image information. And the laser beam 12 passes through an exposure window 128 of the process cartridge 100 and scans and exposes the surface of the photosensitive drum 101.

Below the first to fourth process cartridges 100, an intermediate transfer unit 5 as a transfer member is provided. This intermediate transfer unit 5 has a driving roller 5*e*, a tension roller 5*b* and has a transfer belt 5*a* with flexibility extended around.

The photosensitive drum 101 of the first to fourth process cartridges 100 has its lower surface in contact with an upper surface of the transfer belt 5*a*. The contact part is a primary transfer part. On an inner side of the transfer belt 5*a*, a primary transfer roller 5*d* is provided by facing the photosensitive drum 101.

With the driving roller 5*e*, a secondary transfer roller 6 is brought into contact via the transfer belt 5*a*. The contact part between the transfer belt 5*a* and the secondary transfer roller 6 is a secondary transfer part.

Below the intermediate transfer unit 5, a feeding unit 4 is provided. This feeding unit 4 has a paper-feed tray 4*a* loading and accommodating the recording medium 3 and a paper-feed roller 4*b*.

At an upper right part in the apparatus main body 2 in FIG. 2, a fixing device 7 and a paper-discharge device 8 are provided, and an upper surface of the apparatus main body 2 is a paper-discharge tray 9.

The recording medium 3 has a toner image fixed by fixing means provided in the fixing device 7 and is discharged to the paper-discharge tray 9.

Image Forming Operation

An operation for forming a full-color image is as follows.

The photosensitive drums 101 of the first to fourth process cartridges 100 are rotation-driven at a predetermined speed (arrow A direction in FIG. 3). The transfer belt 5*a* is also rotation-driven at a speed corresponding to the speed of the photosensitive drum 101 in a forward direction (arrow B direction in FIG. 2) with respect to the rotation of the photosensitive drum 101.

The laser scanner unit 11 is also driven. In synchronization with the driving of the laser scanner unit 11, in each of the process cartridges 100, a charging roller 102 as a roller member uniformly charges the surface of the photosensitive drum 101 to predetermined polarity and potential. The laser scanner unit 11 scans/exposes the surface of each photosensitive drum 101 with the laser beam 12 in accordance with an image signal of each color.

As a result, an electrostatic latent image according to the image signal in corresponding color is formed on the surface of each photosensitive drum 101. The formed electrostatic latent image is developed by the development roller 103 rotation-driven at a predetermined speed in a forward direction (arrow C direction in FIG. 3) with respect to the rotation of the photosensitive drum 101.

By means of the electrophotographic image-forming process operation as above, a toner image in yellow color corresponding to a yellow component in the full-color image is formed on the photosensitive drum 101 of the first process cartridge 100Y. And the toner image is primarily transferred onto the transfer belt 5*a*.

Similarly, on the photosensitive drum 101 of the second process cartridge 100M, a magenta-color toner image corresponding to a magenta component of the full-color image is formed. And the toner image is superposed on the toner image in yellow color already having been transferred onto the transfer belt 5*a* and primarily transferred.

Similarly, on the photosensitive drum 101 of the third process cartridge 100C, a cyan-color toner image corresponding to a cyan component of the full-color image is formed. And the toner image is superposed on the toner image in yellow color and magenta color already having been transferred onto the transfer belt 5*a* and primarily transferred.

Similarly, on the photosensitive drum 101 of the fourth process cartridge 100K, a black-color toner image corresponding to a black component of the full-color image is formed. And the toner image is superposed on the toner image in yellow color, magenta color, cyan color already having been transferred onto the transfer belt 5*a* and primarily transferred.

As described above, an unfixed toner image in four-color of yellow color, magenta color, cyan color, black color is formed on the transfer belt 5*a*.

On the other hand, the recording medium 3 is separated one by one and fed at predetermined control timing. The recording medium 3 is introduced into a secondary transfer portion, which is a contact part between the secondary transfer roller 6 and the transfer belt 5*a* at predetermined control timing.

As a result, in a process in which the recording medium 3 is conveyed to the secondary transfer portion, the four-color superposed toner image on the transfer belt 5*a* is sequentially transferred in a lump-sum on the surface of the recording medium 3.

In more detail, the constitution of the image forming apparatus 1 will be explained below.

Schematic Constitution of Attachment/Detachment of Process Cartridge

Figure 4:
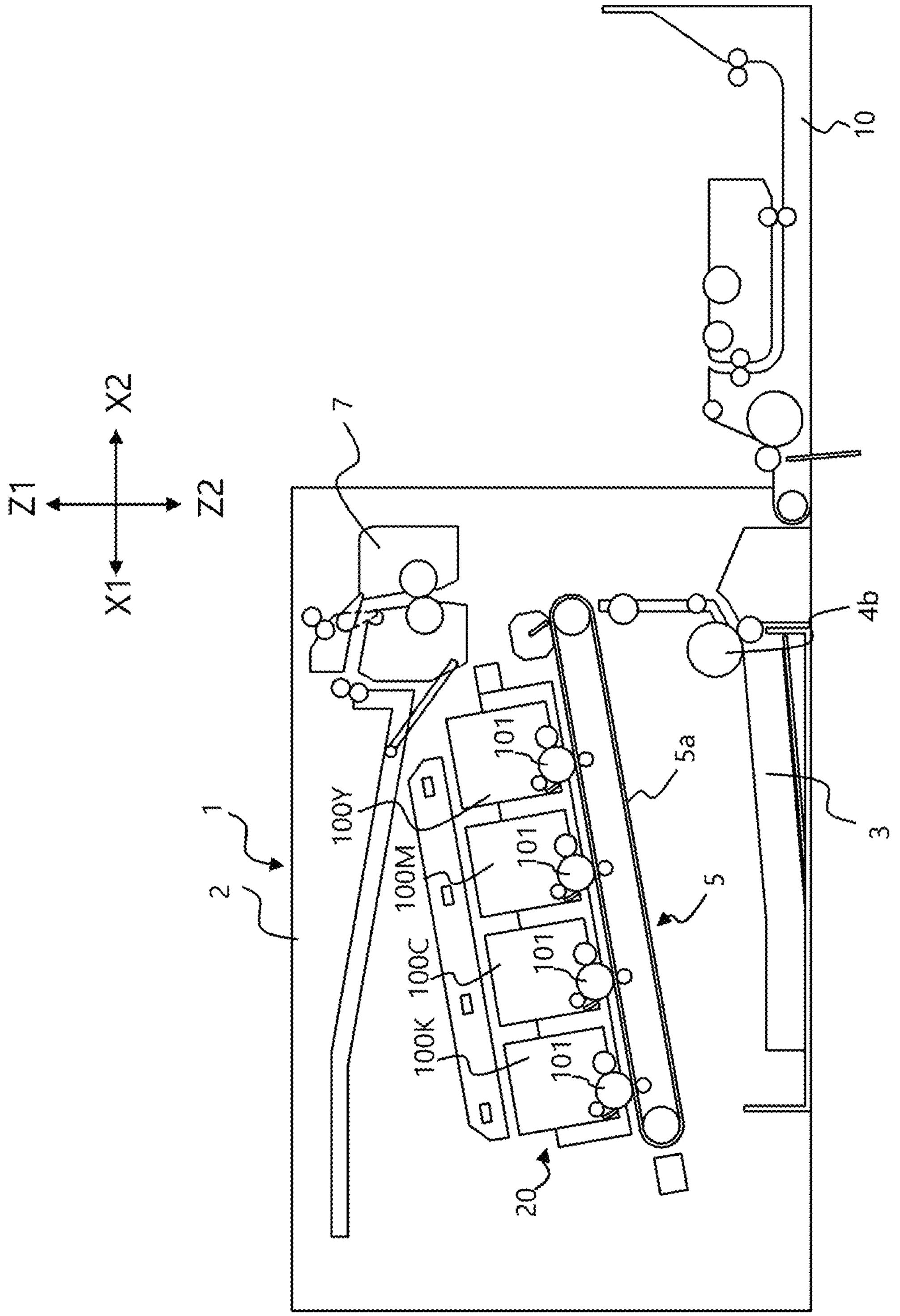
FIG. 4 is a sectional diagram of the image forming apparatus of the Embodiment 1.
Figure 5:
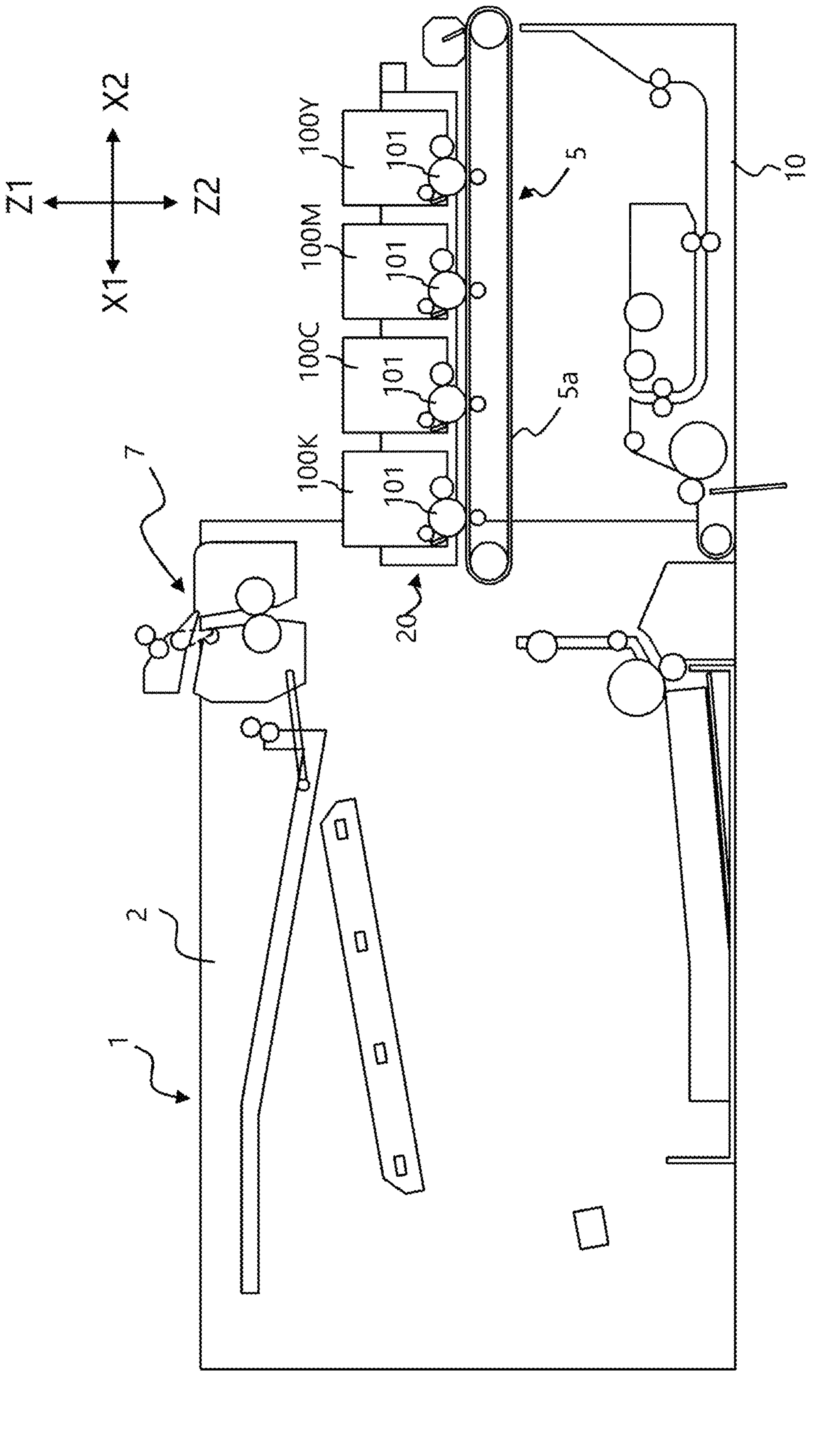
FIG. 5 is a sectional view of the image forming apparatus of the Embodiment 1.
Figure 6:
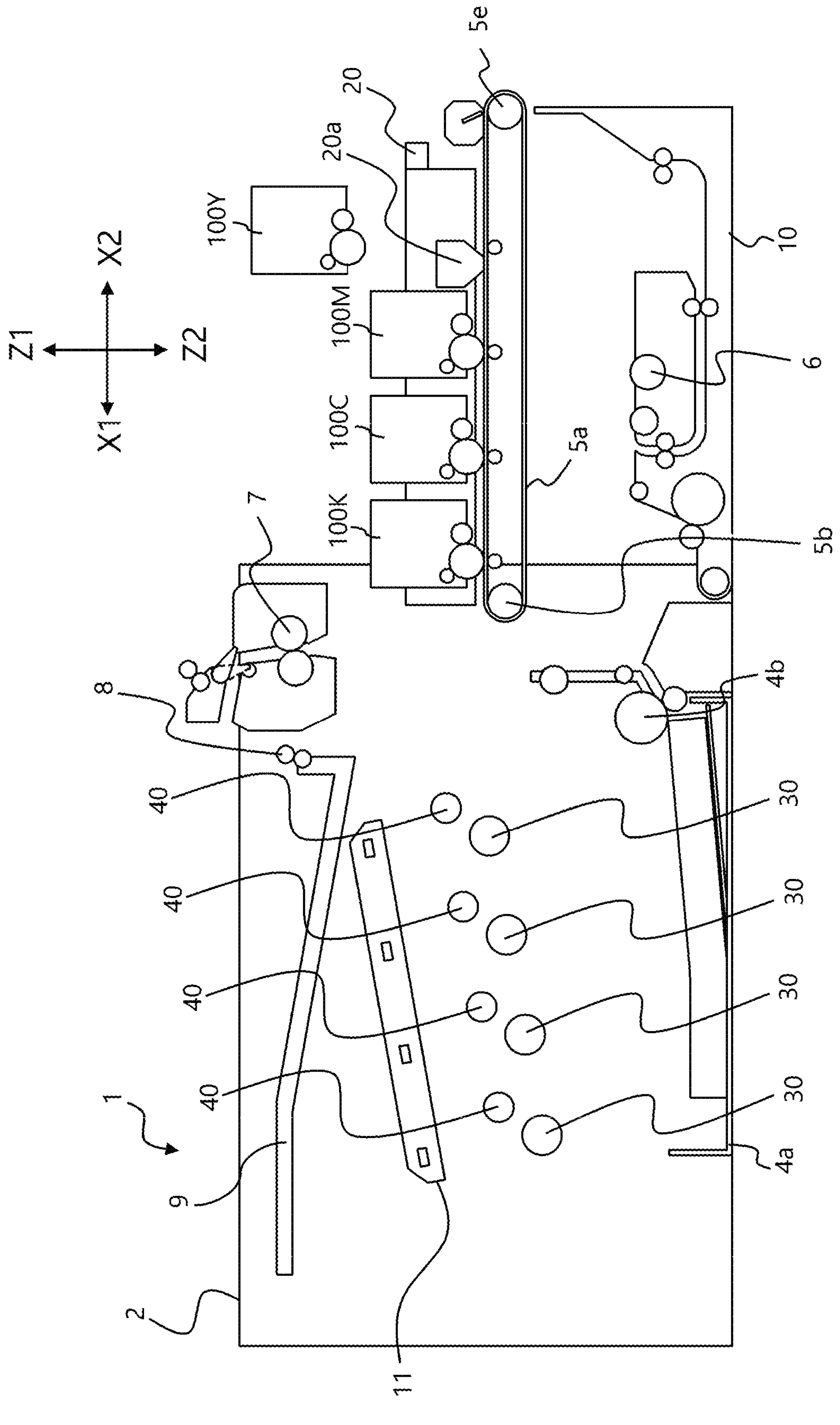
FIG. 6 is a sectional view of the image forming apparatus of the Embodiment 1.

A cartridge tray (hereinafter referred to as a tray) 20 supporting the process cartridge 100 will be explained in more detail by using FIGS. 4 to 6. FIG. 4 is a sectional diagram of the image forming apparatus 1 in which the tray 20 is located inside the apparatus main body 2 in a state where the front door 10 is open. FIG. 5 is a sectional diagram of the image forming apparatus 1 in which the tray 20 is located outside the apparatus main body 2 in a state where the front door 10 is open and in a state where the process cartridge 100 is accommodated inside the tray 20. FIG. 6 is a sectional diagram of the image forming apparatus 1 in a state where the tray 20 is located outside the apparatus main body 2 in a state where the front door 10 is open and in a state where the process cartridge 100 is removed from the tray 20.

As shown in FIG. 4 and FIG. 5, the tray 20 is movable in an arrow X1 direction (pushing-in direction) and an arrow X2 direction (withdrawing direction), which are substantially horizontal directions, with respect to the apparatus main body 2. That is, the tray 20 is provided capable of being withdrawn and pushed-in with respect to the apparatus main body 2, and in a state where the apparatus main body 2 is installed on a horizontal plane, the tray 20 is configured to be movable in the substantially horizontal direction. Here, the state in which the tray 20 is located inside the apparatus main body 2 in the state in which the front door 10 is open (state in FIG. 4) is referred to as an inside position. In addition, the state in which the tray 20 is located outside the apparatus main body 2 (state in FIG. 5) is referred to as an outside position. At the inside position and the outside position, the photosensitive drum 101 and the transfer belt 5*a* are in a separated state.

In addition, the tray 20 has an attaching portion 20*a* to which the first process cartridge 100Y can be detachably attached as shown in FIG. 6 at the outside position. Similarly, the tray 20 also has the attaching portion 20*a* to which the second to fourth process cartridges 100M, 100C, 100K can be detachably attached. And the process cartridge 100 moves to the inside of the apparatus main body 2 with the movement of the tray 20 in a state disposed in the attaching portion 20*a*. In this Embodiment, the intermediate transfer unit 5 rises in an arrow Z1 direction and moves to a position at image formation (position where the photosensitive drum 101 and the transfer belt 5*a* are brought into contact) by a link mechanism, not shown, by closing the front door 10. In addition, by opening the front door 10, the intermediate transfer unit 5 lowers in an arrow Z2 direction, and the photosensitive drum 101 and the transfer belt 5*a* are separated.

As described above, by means of the tray 20, a plurality of the process cartridges 100 can be moved in a lump-sum to positions at which image formation can be made inside the apparatus main body 2 and can also be withdrawn in a lump-sum to outside of the apparatus main body 2.

Entire Constitution of Process Cartridge

A configuration of the process cartridge will be explained by using FIGS. 7 to 10.

Figure 7:
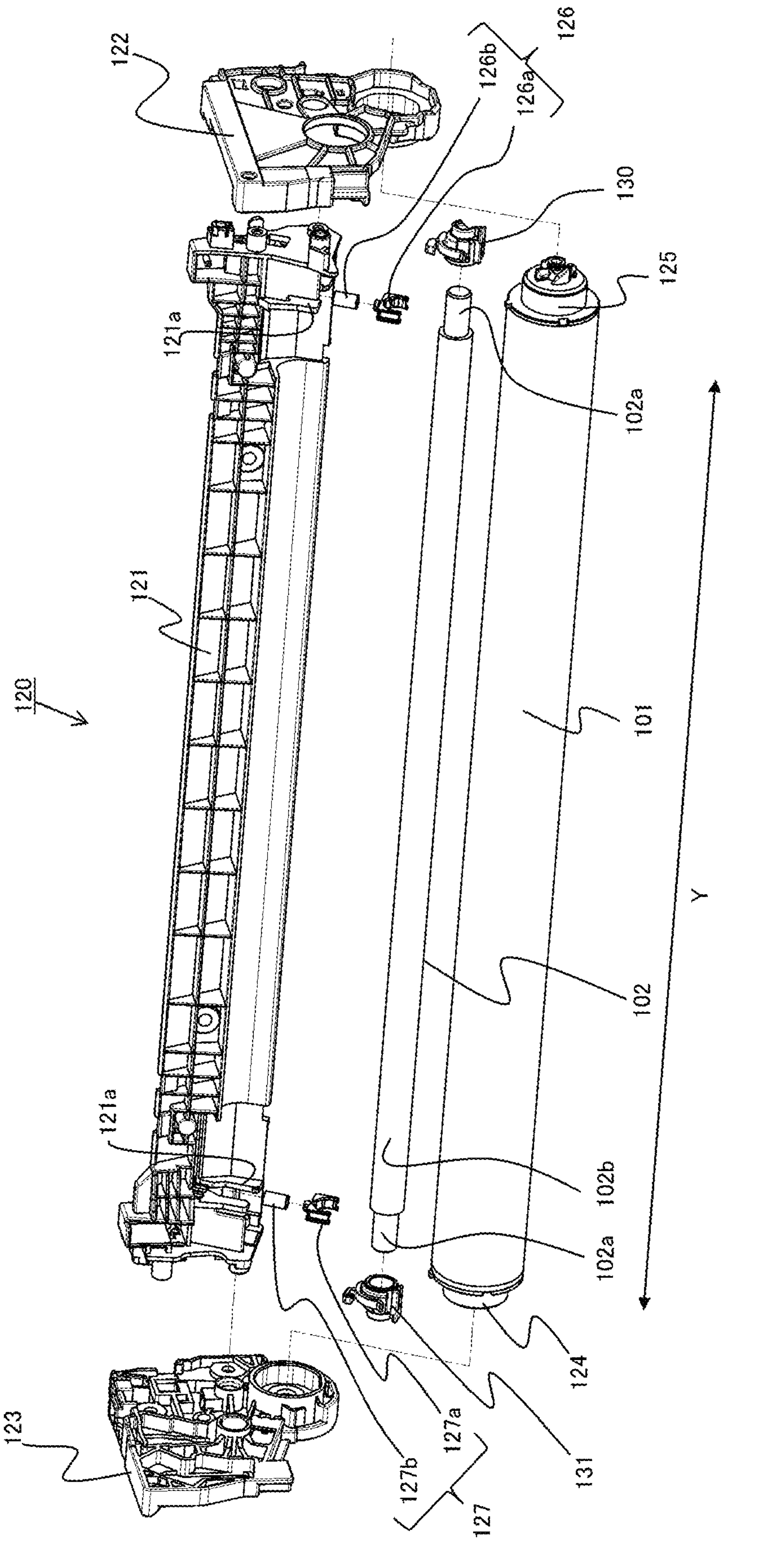
FIG. 7 is an exploded perspective view of the charging unit of the Embodiment 1.
Figure 8:
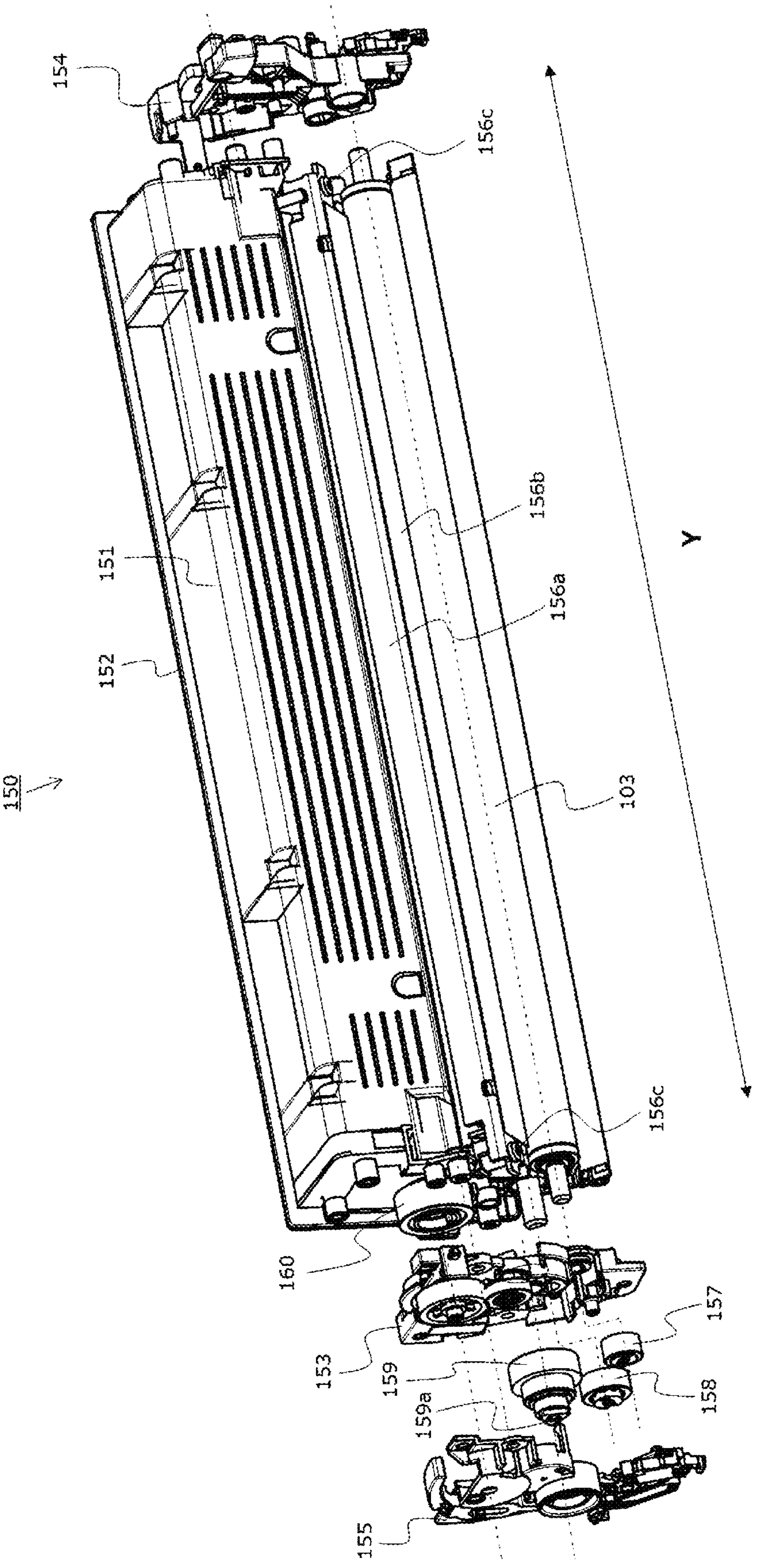
FIG. 8 is an exploded perspective view of a development unit of the Embodiment 1.
Figure 9:
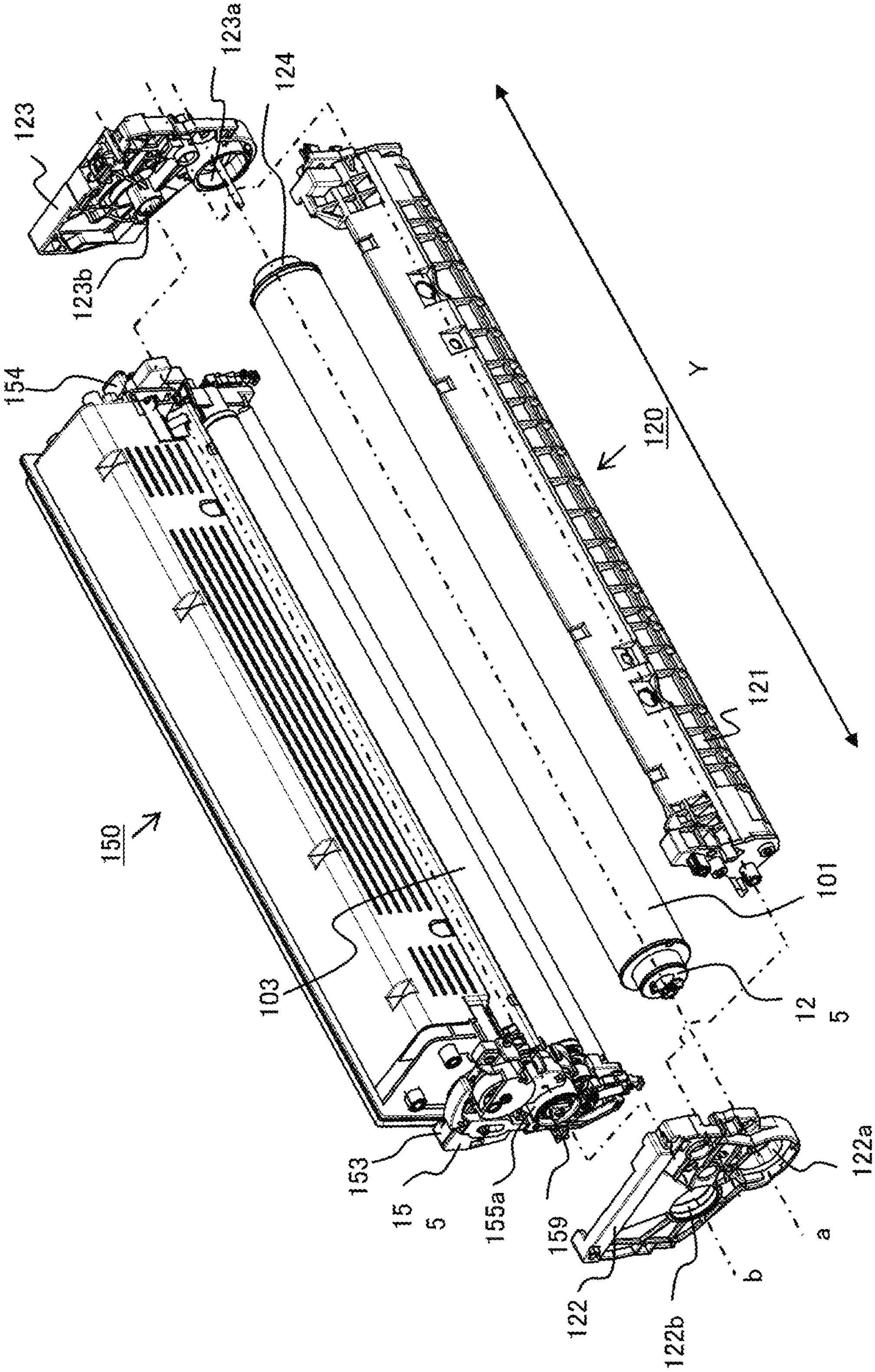
FIG. 9 is an assembly perspective view of the process cartridge of the Embodiment 1.
Figure 10:
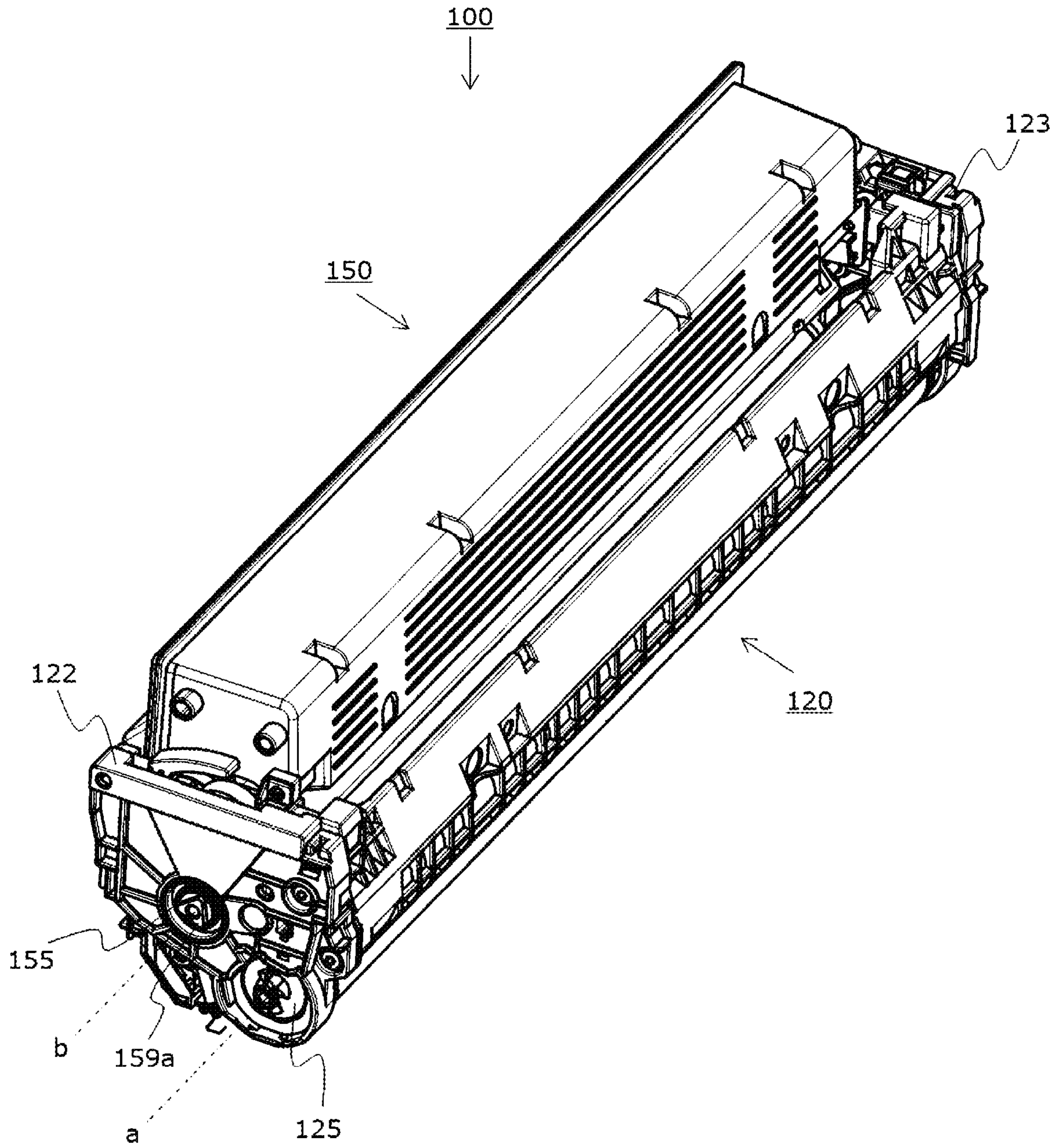
FIG. 10 is a perspective view of the process cartridge of the Embodiment 1.

FIG. 7 is an exploded perspective view of the charging unit 120. FIG. 8 is an exploded perspective view of the development unit 150. FIG. 9 is an assembly perspective view of the process cartridge 100 as viewed from a driving side, which is one end side in an axial direction of the photosensitive drum 101. FIG. 10 is a perspective view of the process cartridge 100 as viewed from the driving side.

The process cartridge 100 includes the photosensitive drum 101 and the process means working on the photosensitive drum 101. Here, the process means includes the charging roller 102 (roller member) as charging means for charging the photosensitive drum 101, the development roller 103 as development means for developing a latent image formed on the photosensitive drum 101 and the like. And the process cartridge 100 is divided into the charging unit 120 and the development unit 150.

In the following explanation, a longitudinal direction Y of the charging unit 120 and the development unit 150 is a direction substantially parallel to a rotation axis a of the photosensitive drum 101 (FIG. 9).

Constitution of Charging Unit

As shown in FIG. 7 and FIG. 9, the charging unit 120 is constituted by the photosensitive drum 101, the charging roller 102, a frame body 121. In addition, the charging unit 120 includes a charging-roller bearing unit 126 disposed on an end part on the driving side of the charging roller 102 and a charging-roller bearing unit 127 disposed on an end part of the non-driving side of the charging roller 102. The charging-roller bearing unit 126 has a driving-side charging-roller bearing 126*a* rotatably supporting the charging roller 102 and a pressurizing spring 126*b* for biasing the charging roller 102 toward the photosensitive drum 101. Similarly, the charging-roller bearing unit 127 has a non-driving side charging-roller bearing 127*a* rotatably supporting the charging roller 102 and a pressurizing spring 127*b* for biasing the charging roller 102 toward the photosensitive drum 101. A shaft portion 102*a* of the charging roller 102 is rotatably supported by the driving-side charging-roller bearing 126*a* and the non-driving side charging-roller bearing 127*a* as bearing members. The driving-side charging-roller bearing 126*a* and the non-driving side charging-roller bearing 127*a* are mounted on a bearing mounting portion 121*a* of the frame body 121 and are biased toward the photosensitive drum 101 (arrow F direction in FIG. 3) by the pressurizing springs 126*b*, 127*b* as biasing members. In addition, on the end part on the driving side of the shaft portion 102*a* of the charging roller 102, a driving-side separating member 130 is mounted, and on the end part on the non-driving side, the non-driving side separating member 131 is mounted. The photosensitive drum 101 is rotatably supported by a driving-side cartridge cover member 122 and a non-driving side cartridge cover member 123 provided on both ends in the longitudinal direction of the process cartridge 100.

As shown in FIG. 9, on one end side in the longitudinal direction of the photosensitive drum 101, a coupling member 125 for transmitting a driving force to the photosensitive drum 101 is provided. The coupling member 125 is engaged with a main body side drum driving coupling 30 (see FIG. 6) as a drum-driving output portion of the apparatus main body 2, and the driving force of a driving motor (not shown) of the apparatus main body 2 is transmitted to the photosensitive drum 101 and is rotated in the arrow A direction in FIG. 3. In addition, the photosensitive drum 101 has a drum flange 124 on the other end side in the longitudinal direction. The driving-side charging roller bearing 126*a* and the non-driving side charging roller bearing 127*a* supporting the charging roller 102 are supported by the frame body 121 so that the charging roller 102 can be brought into contact with the photosensitive drum 101 and driven-rotated (arrow E direction in FIG. 3).

Constitution of Development Unit

The development unit 150 is, as shown in FIG. 3 and FIG. 8, constituted by the development roller 103, a toner conveyance roller 104, a development blade 156, a development frame-body and the like. The development frame-body is constituted by a first development frame-body 151 and a second development frame-body 152. The first development frame-body 151 and the second development frame-body 152 are connected by supersonic welding or the like. The development frame-body has a toner accommodating portion 162 for accommodating the toner to be supplied to the development roller 103. In addition, the development frame-body rotatably supports the development roller 103, the toner conveyance roller 104 via a driving-side bearing 153, a non-driving side bearing 154 and holds the development blade 156 which regulates a layer thickness of a toner on a circumferential surface of the development roller 103.

The development blade 156 is an elastic member 156*b*, which is a sheet-like metal with a thickness of approximately 0.1 mm attached to a support member 156*a*, which is a metal material having an L-shaped section by welding or the like. The development blade 156 is attached to the development frame-body by fixing screws 156*c* at two spots on one end side and the other end side in the longitudinal direction.

On the one end side in the longitudinal direction of the development unit 150, a development drive-input gear 159 for transmitting the driving force to the development unit 150 is provided. On the development drive-input gear 159, a development-input coupling 159*a* for receiving driving from a main body side development driving coupling 40 (see FIG. 6) of the apparatus main body 2 is provided, and the driving force of the driving motor (not shown) of the apparatus main body 2 is input into the development unit 150.

The driving force input into the development unit 150 can rotate the development roller 103 in the arrow C direction in FIG. 3 by being transmitted to a development roller gear 157. In addition, by being transmitted to a toner conveyance roller gear 158, the toner conveyance roller 104 can be rotated in an arrow D direction in FIG. 3. In addition, by being transmitted to an agitating gear 160, an agitating member 161 can be rotated in an arrow G direction in FIG. 3 so as to agitate the toner in the toner accommodating portion 162. The agitating member 161 has a rotating shaft 161*a* parallel to a rotating-axis direction of the development roller 103 and an agitating sheet 161*b* as a conveyance member, which is a sheet having flexibility. One end of the agitating sheet 161*b* is attached to the rotating shaft 161*a*, while the other end of the agitating sheet 161*b* is a free end, and when the rotating shaft 161*a* is rotated, and the agitating sheet 161*b* is also rotated with that, whereby the toner is agitated by the agitating sheet 161*b*.

On one end side in the longitudinal direction of the development unit 150, a development cover member 155 which supports and covers the development drive-input gear 159 is provided.

Assembling of Charging Unit and Development Unit

By using FIG. 9, assembling of the charging unit 120 and the development unit 150 will be explained. The charging unit 120 and the development unit 150 are connected by the driving-side cartridge cover member 122 and the non-driving side cartridge cover member 123 provided on both ends in the longitudinal direction of the process cartridge 100. In the driving-side cartridge cover member 122 provided on the one end side in the longitudinal direction of the process cartridge 100, a development-unit support hole 122*b* for supporting the development unit 150 swingably (movably) is provided. Similarly, in the non-driving side cartridge cover member 123 provided on the other end side in the longitudinal direction of the process cartridge 100, a development-unit support hole 123*b* for swingably supporting the development unit 150 is provided. Furthermore, in the driving-side cartridge cover member 122 and the non-driving side cartridge cover member 123, drum support holes 122*a*, 123*a* for rotatably supporting the photosensitive drum 101 are provided, respectively. Here, on one end side, in the development-unit support hole 122*b* of the driving-side cartridge cover member 122, an outer diameter part of a cylinder portion 155*a* of the development cover member 155 is fitted. On the other end side, in the development-unit support hole 123*b* of the non-driving side cartridge cover member 123, an outer diameter part of a cylinder portion (not shown) of the non-driving side bearing 154 is fitted. Furthermore, both ends in the longitudinal direction of the photosensitive drum 101 are fitted in the drum support hole 122*a* of the driving-side cartridge cover member 122 and the drum support hole 123*a* of the non-driving side cartridge cover member 123. Then, the driving-side cartridge cover member 122 and the non-driving side cartridge cover member 123 are fixed to the charging unit 120 by a screw, an adhesive or the like, not shown. As a result, the development unit 150 is rotatably supported with respect to the charging unit 120 (photosensitive drum 101) by the driving-side cartridge cover member 122 and the non-driving side cartridge cover member 123. And at the image formation, the development roller 103 can be positioned at a position of acting on the photosensitive drum 101.

A state in which the charging unit 120 and the development unit 150 are assembled and integrally formed as the process cartridge 100 by means of the processes as above is shown in FIG. 10.

Note that an axial line connecting a center of the development-unit support hole 122*b* of the driving-side cartridge cover member 122 and a center of the development-unit support hole 123*b* of the non-driving side cartridge cover member 123 shall be referred to as a swing axis b. Here, the cylinder portion 155*a* of the development cover member 155 on the one end side is coaxial with the development-input coupling 159*a*. That is, the development unit 150 is constituted such that the driving force is transmitted from the apparatus main body 2 in this swing axis b. In addition, the development unit 150 is supported around the swing axis b capable of rotational movement.

Separation Constitution of Charging Roller

Figure 11:
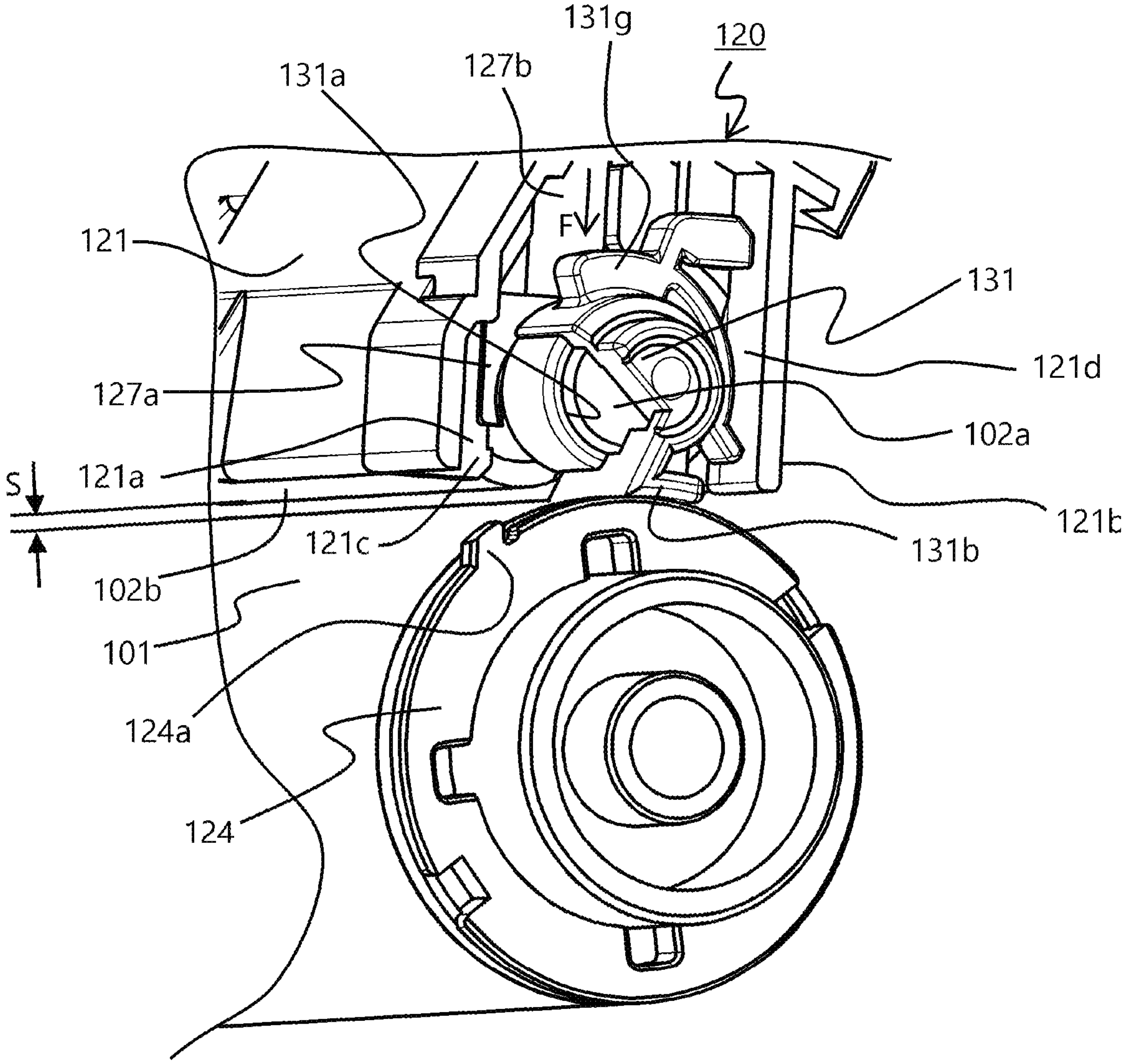
FIG. 11 is a partial perspective view of a non-driving side end part of the charging unit of the Embodiment 1.

By using FIG. 11, separation constitution of the charging roller 102 will be explained. FIG. 11 is a partial perspective view of the end part of the charging roller 102 on the non-driving side. Though explanation will be given by using the non-driving side, the driving side on the opposite side also has the similar configuration.

By fitting a cylinder portion 131*a* of the non-driving side separating member 131 with the shaft portion 102*a* of the charging roller 102, the non-driving side separating member 131 is mounted. As a result, the non-driving side separating member 131 is rotatable around the shaft portion 102*a*. As described above, the charging roller 102 is biased in the direction (arrow F direction) approaching the photosensitive drum 101 by the pressurizing spring 127*b*. Here, an abutted portion 131*b* of the non-driving side separating member 131 is abutted against the surface of the photosensitive drum 101. As a result, movement of the charging roller 102 in a direction approaching the photosensitive drum 101 is regulated and held in a state where a clearance S is provided between the surface of the photosensitive drum 101 and a contact portion 102*b* of the charging roller 102. The abutted portion 131*b* is a projecting portion projecting in a direction intersecting the shaft portion 102*a* of the charging roller 102.

Separation Release Configuration of Charging Roller

Figure 12C:
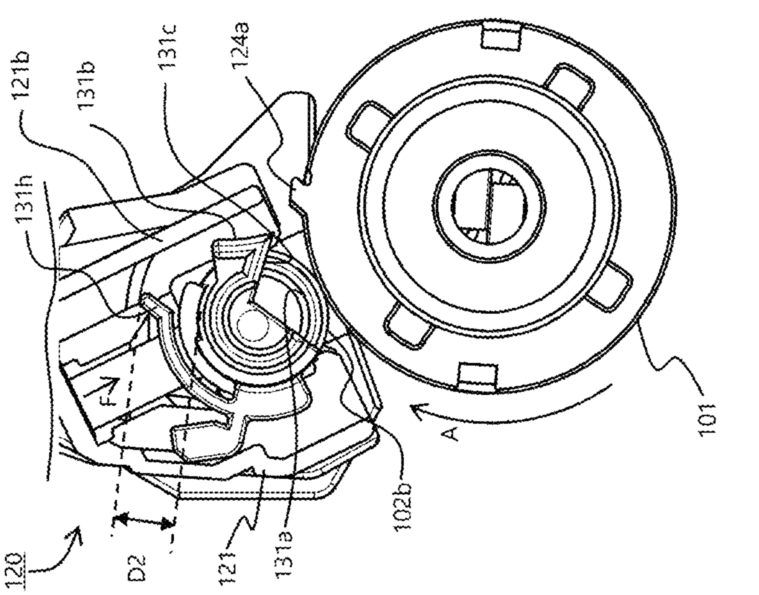
FIGS. 12A to 12C are partial side views of the non-driving side end part of the charging unit of the Embodiment 1.
Figure 12B:
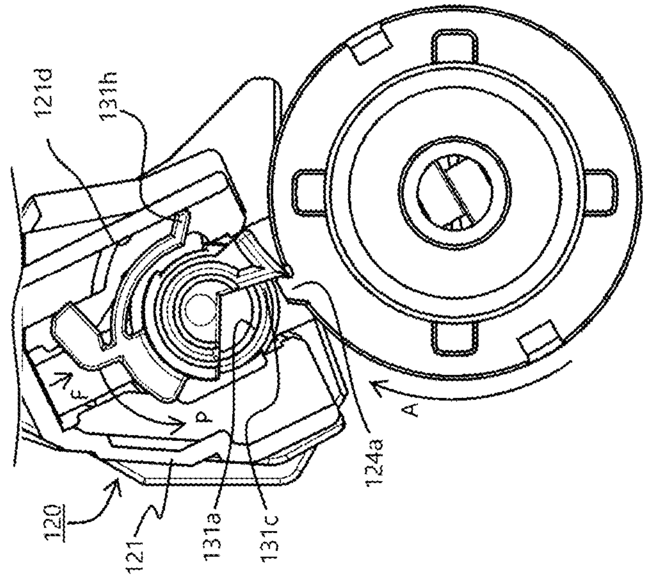
Figure 12A:
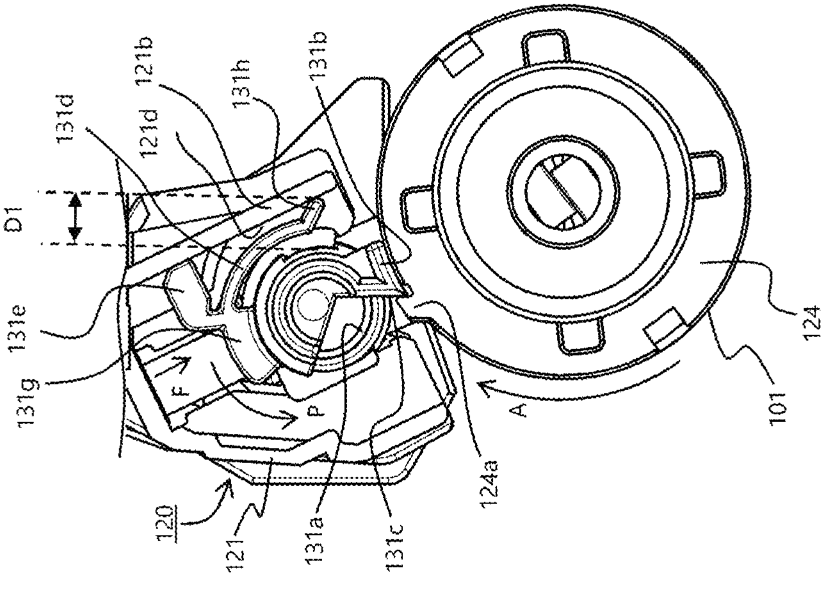

Subsequently, by using FIGS. 12A to 12C, a separation release configuration of the charging roller 102 will be explained. FIGS. 12A to 12C are partial side views of the end part of the charging unit 120 on the non-driving side. Though explanation will be made by using the non-driving side, the driving side on the opposite side also has the similar configuration.

FIG. 12A illustrates a state in which the photosensitive drum 101 rotates in the arrow A direction, and a release projection 124*a* of a drum flange 124 begins to be engaged with an engagement surface 131*c* of the non-driving side separating member 131. In this state, the abutted portion 131*b* of the non-driving side separating member 131 is still in the state of being abutted against the surface of the photosensitive drum 101. In addition, such a state is brought about that an elastic deformation portion 131*d* of the non-driving side separating member 131 is brought into contact with a wall portion 121*b* of the frame body 121 and is deformed radially inward is brought about.

FIG. 12B illustrates a state in which, from the state in FIG. 12A, the photosensitive drum 101 has been further rotated in the arrow A direction. When the engagement surface 131*c* is pushed by the release projection 124*a*, the non-driving side separating member 131 rotates in an arrow P direction around the cylinder portion 131*a*. At this time, the elastic deformation portion 131*d* allows the rotation of the non-driving side separating member 131 by being further deformed than the state in FIG. 12A.

When the non-driving side separating member 131 further rotates from the state in FIG. 12B, a separation-release completed state as shown in FIG. 12C is brought about. At this time, the abutted portion 131*b* of the non-driving side separating member 131 has been moved to a position that is not in contact with the surface of the photosensitive drum 101. As a result, the contact portion 102*b* of the roller 102 can be brought into contact with the surface of the photosensitive drum 101. The charging roller 102 is an example of a roller member rotating in a state in contact with the photosensitive drum 101 at the contact portion 102*b* at the image formation.

Separating-Member Holding Configuration at Assembly of Charging Unit

Figure 1:
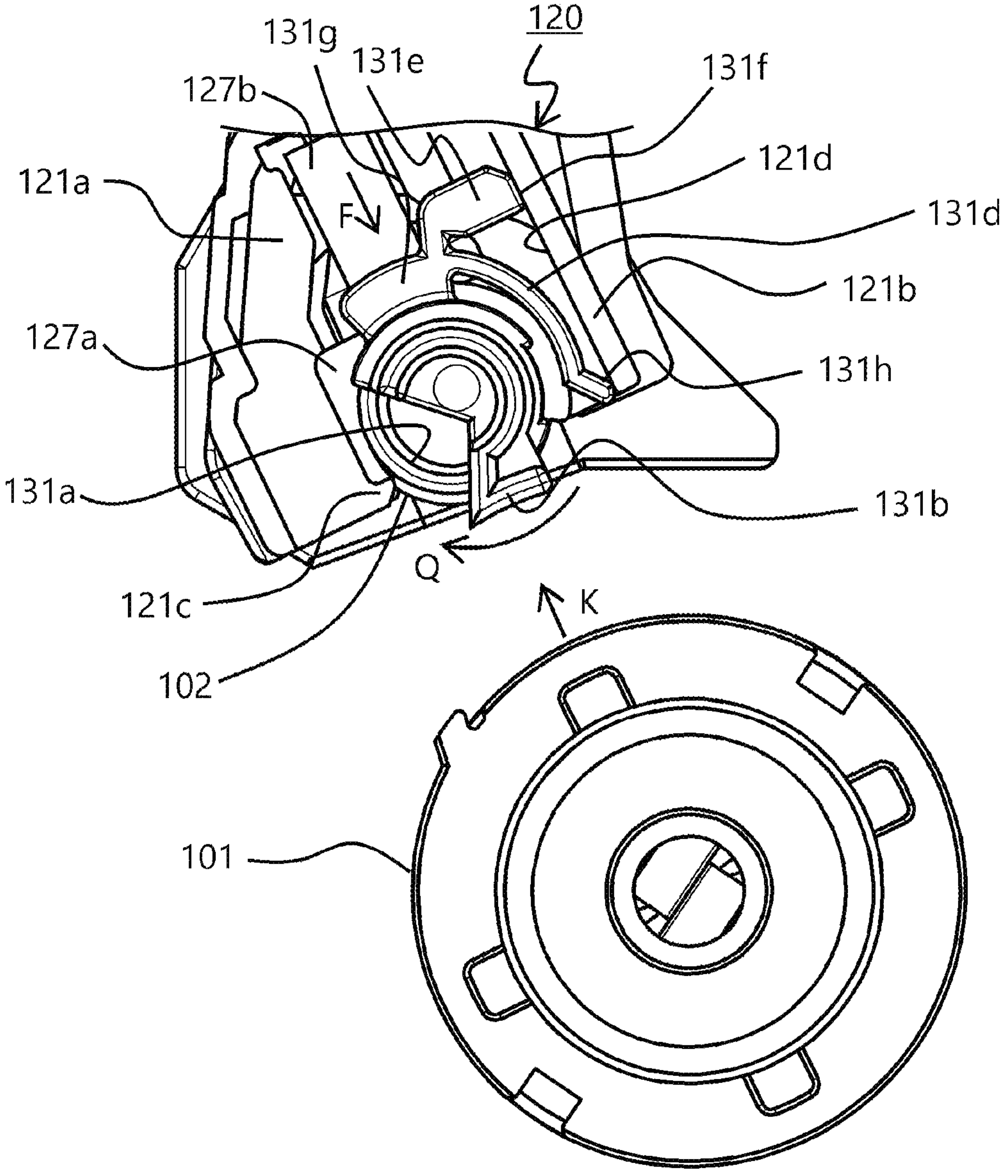
FIG. 1 is a partial side view of a non-driving side end part of a charging unit of an Embodiment 1.

By using FIG. 1, a holding configuration of the separating member at the assembly of the charging unit 120 will be explained. FIG. 1 is a side view of the non-driving side of the charging unit 120 in a state before the photosensitive drum 101 is assembled. The explanation will be given by using the non-driving side, but the driving side on the opposite side has the similar configuration.

The charging unit 120 in the state before the photosensitive drum 101 is assembled is a part excluding the photosensitive drum 101 in the charging unit 120, and this is an example of a roller holding unit forming, when the photosensitive drum 101 is assembled thereto, a part of the charging unit 120. The part excluding the photosensitive drum 101 in the charging unit 120 can be considered to be a roller holding unit forming, when the photosensitive drum 101 is assembled thereto, a part of the process cartridge 100 detachably attached to the image forming apparatus 1.

The non-driving side charging-roller bearing 127*a* is held by the bearing mounting portion 121*a*, which is a part of the frame body 121, so as to be movable in a direction parallel to the first direction (arrow F direction), which is a direction approaching the position to which the photosensitive drum 101 is assembled. The first direction can be considered to be a direction opposite to a direction (arrow K direction) bringing the photosensitive drum 101 closer to the frame body 121, when the photosensitive drum 101 is assembled. In addition, considering the state in which the photosensitive drum 101 is assembled to the charging unit 120, it can be considered that the non-driving side charging-roller bearing 127*a* is held by the frame body 121 (bearing mounting portion 121*a*) so as to be movable in the direction in which a distance to the photosensitive drum 101 changes. In this case, the first direction can be considered to be a direction in which the non-driving side charging-roller bearing 127*a* approaches the photosensitive drum 101. The non-driving side charging-roller bearing 127*a* is biased in a first direction (F direction) with respect to the frame body 121 by the pressurizing spring 127*b* as a first biasing member. The pressurizing spring 127*b* is provided between the non-driving side charging-roller bearing 127*a* and the frame body 121.

Figure 16:
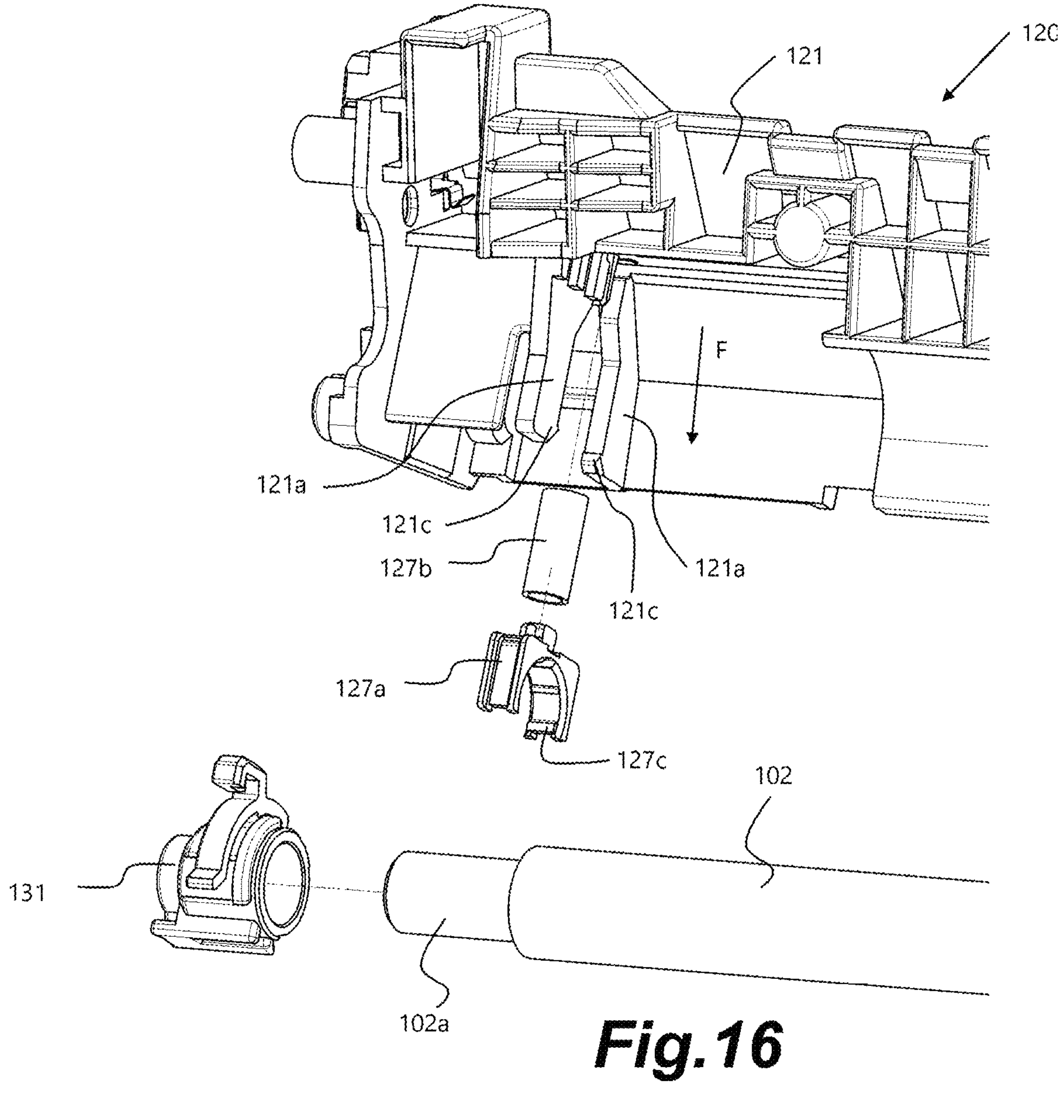
FIG. 16 is an exploded perspective view of the non-driving side of the charging unit of the Embodiment 1.
Figure 17:
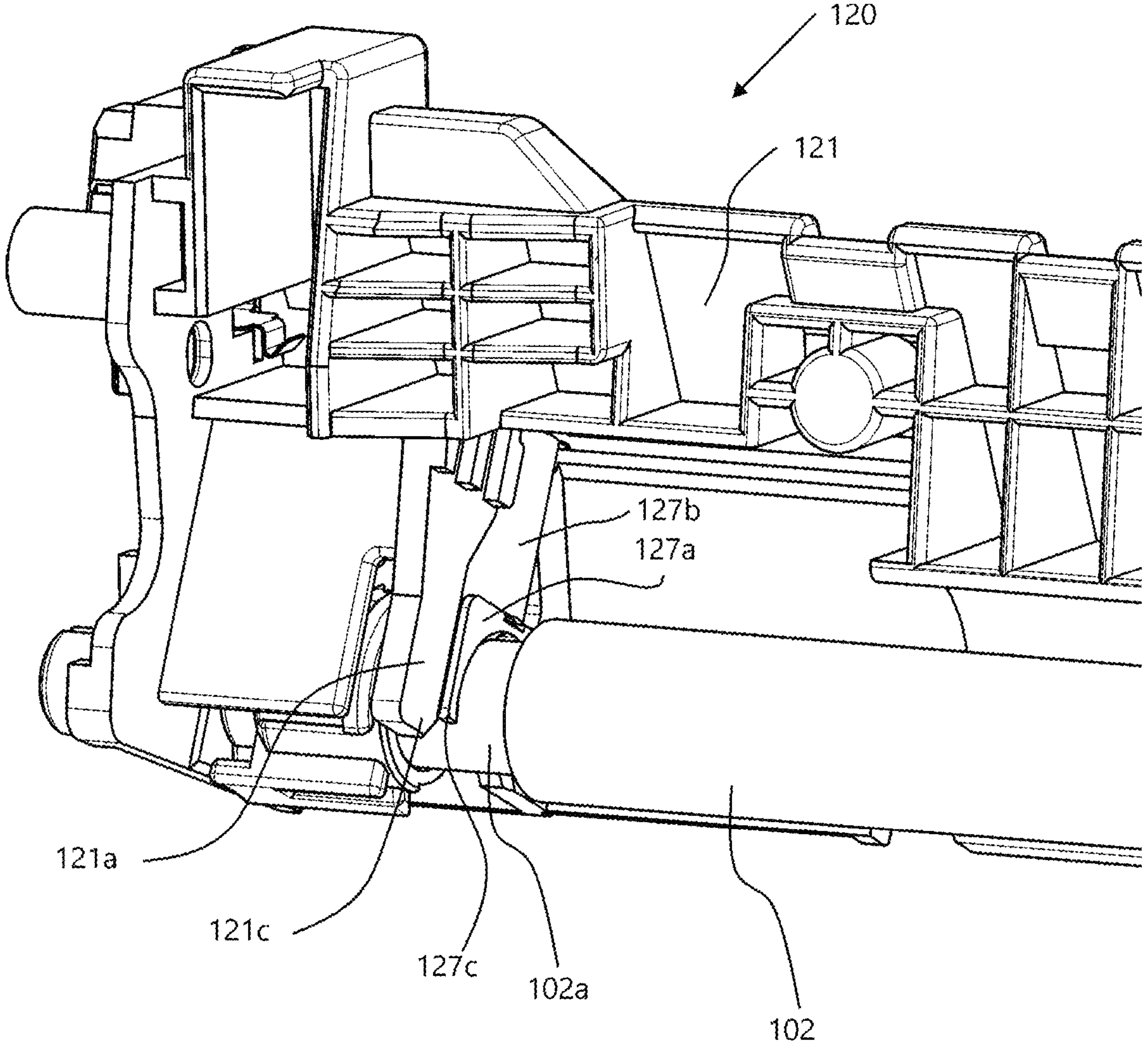
FIG. 17 is a perspective view of the non-driving side of the charging unit of the Embodiment 1.
Figure 18:
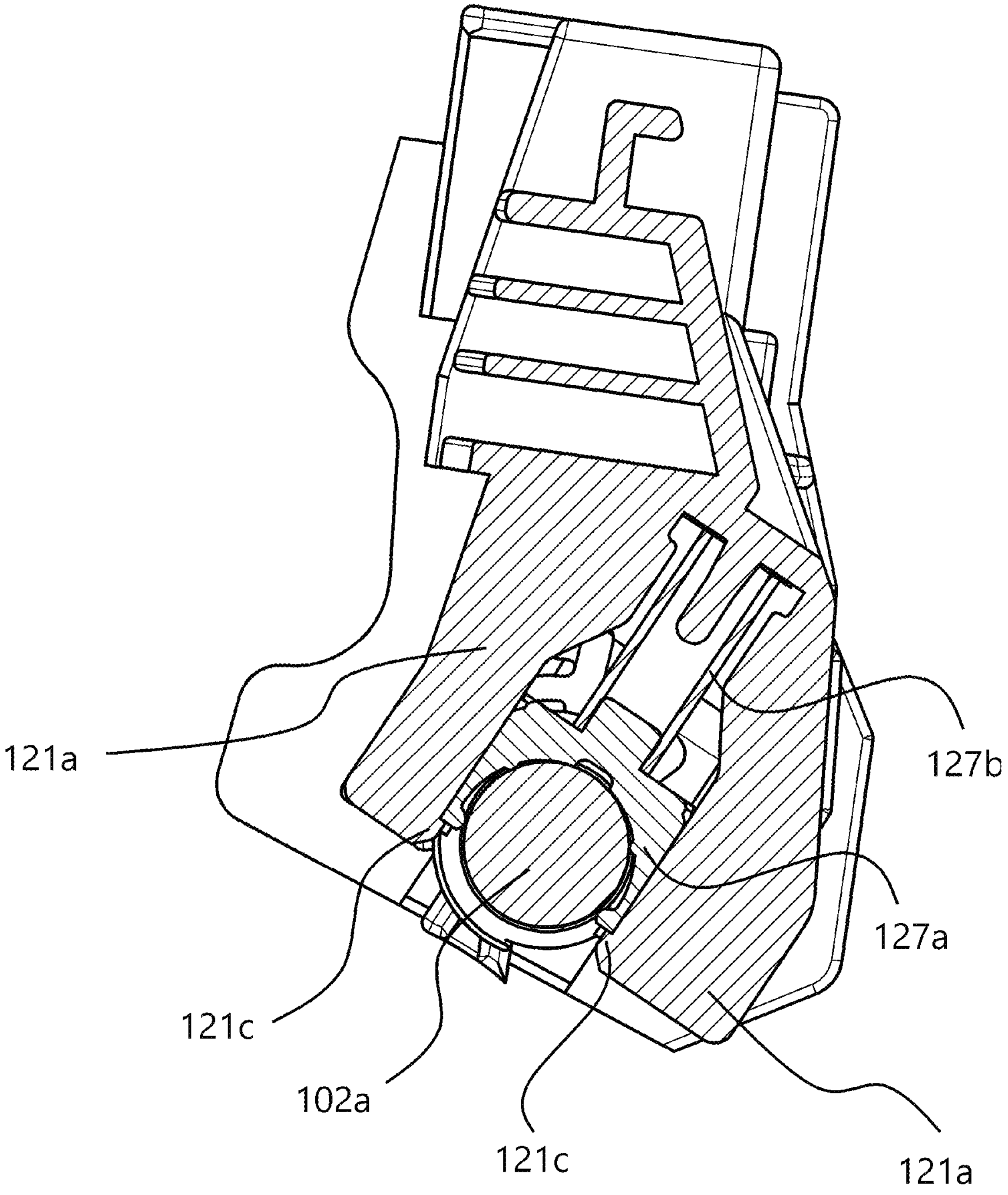
FIG. 18 is a sectional view of the non-driving side of the charging unit of the Embodiment 1.

Since the photosensitive drum 101 is not present, the charging roller 102 is to move in the biasing direction (arrow F direction) of the pressurizing spring 127*b*. At this time, a movement regulating portion 121*c* of the frame body 121 regulates movement of the non-driving side charging-roller bearing 127*a*, whereby the movement of the charging roller 102 in the arrow F direction is in the regulated state. With reference to FIG. 16, FIG. 17, and FIG. 18, a structure of regulation of movement of the non-driving side charging-roller bearing 127*a* by the movement regulating portion 121*c* will be explained. FIG. 16 is an exploded perspective view of the non-driving side of the charging unit 120. FIG. 17 is a perspective view of the non-driving side of the charging unit 120. FIG. 18 is a sectional view of the non-driving side charging-roller bearing 127*a* and members around it of the charging unit 120 by a section perpendicular to a rotation axis of the charging roller 102. The frame body 121 has the bearing mounting portion 121*a*, and on an end part on the biasing direction (F direction) side of the pressurizing spring 127*b* of the bearing mounting portion 121*a*, the movement regulating portion 121*c*, which is an engagement projection projecting toward the charging roller 102 is formed. By means of engagement between the projection of this movement regulating portion 121*c* and an engaged portion 127*c* formed on the end part on the F direction side of the non-driving side charging-roller bearing 127*a*, the movement of the non-driving side charging-roller bearing 127*a* in the F direction is regulated. As shown in FIG. 1, FIG. 17 and FIG. 18, in the state in which the photosensitive drum 101 is not assembled to the charging roller 102, the movement regulating portion 121*c* of the bearing mounting portion 121*a* is engaged with the engaged portion 127*c* of the non-driving side charging-roller bearing 127*a*. As a result, the non-driving side charging-roller bearing 127*a* is positioned at a first position. The position of the non-driving side charging-roller bearing 127*a* shown in FIG. 1, FIG. 17, and FIG. 18, where the end part of the non-driving side charging-roller bearing 127*a* is engaged with the movement regulating portion 121*c*, is referred to as the first position. The first position is a position where the non-driving side charging-roller bearing 127*a* is positioned in the state in which the photosensitive drum 101 is not assembled to the roller holding unit (charging unit 120). The movement regulating portion 121*c* is an example of a first regulating member capable of regulating movement of the non-driving side charging-roller bearing 127*a* in the first direction (arrow F direction) from the first position.

In this state, the elastic deformation portion 131*d* of the non-driving side separating member 131 is brought into contact with the wall portion 121*b* and is elastically deformed so as to receive a force from the wall portion 121*b*. By means of this force, the non-driving side separating member 131 is to rotate in an arrow Q direction with a center axis of the cylinder portion 131*a* as a rotation center. However, when a locking surface 131*f* of a reverse-rotation preventing portion 131*e* is brought into contact with the wall portion 121*b*, the rotation in the arrow Q direction is regulated. As a result, an attitude in the rotating direction of the non-driving side separating member 131 is held by the frame body 121, and the state in which the abutted portion 131*b* faces the arrow K direction, which is an assembling direction of the photosensitive drum 101, is held.

The non-driving side separating member 131 has a second projecting portion 131*g* projecting in a radial direction of the shaft portion 102*a* from the cylinder portion 131*a*. The elastic deformation portion 131*d* is an example of an arm portion which extends along a circumferential direction of the cylinder portion 131*a* with a clearance from the surface of the cylinder portion 131*a* from the second projecting portion 131*g* and is capable of elastic deformation in the radial direction. The elastic deformation portion 131*d* constitutes a second biasing member capable of biasing the non-driving side separating member 131 in the second direction (arrow Q direction), which is a rotating direction around the shaft portion 102*a*, to the frame body 121. In the Embodiment 1, the elastic deformation portion 131*d* is an elastically deformable elastic portion provided on the non-driving side separating member 131. A position of the non-driving side separating member 131 shown in FIG. 1, where the reverse-rotation preventing portion 131*e* is brought into contact with the wall portion 121*b*, is referred to as a second position. The second position is a position where the non-driving side separating member 131 is positioned in a state where the photosensitive drum 101 is not assembled to the roller holding unit (charging unit 120). The elastic deformation portion 131*d* causes an biasing force in the second direction (arrow Q direction) to act on the non-driving side separating member 131 by being brought into contact, in the elastically deformed state, with the wall portion 121*b* provided on the frame body 121, when the non-driving side separating member 131 is at the second position. A distance in the radial direction between the surface of the cylinder portion 131*a* in a state where the non-driving side separating member 131 is at the second position and an inner wall 121*d* of the wall portion 121*b* facing the non-driving side separating member 131 of the frame body 121 is referred to as D1 (FIG. 12A). A distance in the radial direction between the surface of the cylinder portion 131*a* in the state in which the elastic deformation portion 131*d* is not elastically deformed and an end part 131*h* of the elastic deformation portion 131*d* is referred to as D2 (FIG. 12C). The distance D1 is smaller than the distance D2. Thus, when the non-driving side separating member 131 is at the second position, the end part 131*h* of the elastic deformation portion 131*d* is brought into contact with the inner wall 121*d* of the frame body 121, and the elastic deformation portion 131*d* is elastically deformed radially inward. As a result, an elastic force for biasing the non-driving side separating member 131 in the second direction (Q direction) is generated.

The reverse-rotation preventing portion 131*e* is an example of a second regulating member capable of regulating rotation of the non-driving side separating member 131 in the second direction (arrow Q direction) from the second position. The reverse-rotation preventing portion 131*e* is an example of a third projecting portion projecting from the second projecting portion 131*g* of the non-driving side separating member 131 in a direction different from the elastic deformation portion 131*d*. In the Embodiment 1, the reverse-rotation preventing portion 131*e* regulates rotation of the non-driving side separating member 131 in the second direction (arrow Q direction) from the second position by being brought into contact with the inner wall 121*d* of the wall portion 121*b* provided in the frame body 121. The wall portion 121*b* is an example of the second wall portion which regulates rotation of the separating member in the second direction from the second position by being brought into contact with the contact portion.

As described above, the abutted portion 131*b* of the non-driving side separating member 131 projects in the first direction (arrow F direction), when the non-driving side separating member 131 is at the second position. As a result, when the photosensitive drum 101 is assembled to the charging unit 120, it is configured such that the abutted portion 131*b* is brought into contact with the surface of the photosensitive drum 101 and can form the clearance S between the photosensitive drum 101 and the charging roller 102.

FIG. 1 is a state in which the photosensitive drum 101 is not assembled to the charging unit 120. In this state, the non-driving side charging-roller bearing 127*a* is in the state in which movement in the first direction is regulated by the movement regulating portion 121*c* at the first position in a state biased in the first direction (arrow F direction) by the pressurizing spring 127*b*. In addition, the non-driving side separating member 131 is in a state where the movement in the second direction is regulated at the second position by the reverse-rotation preventing portion 131*e* in the state biased in the second direction (arrow Q direction) by the elastic deformation portion 131*d*.

Since the non-driving side separating member 131 is held in this attitude in the state before the photosensitive drum 101 is assembled, there is no need for a worker or an apparatus to hold the attitude of the non-driving side separating member 131 in the assembling process of assembling the photosensitive drum 101, and workability is preferable.

FIG. 12A is a state after the photosensitive drum 101 was assembled to the charging unit 120 and before the image forming apparatus 1 operates for the first time. In this state, the non-driving side charging-roller bearing 127*a* is in the state biased by the pressurizing spring 127*b* in the first direction (arrow F direction) and at the position moved in the direction (arrow K direction) opposite to the first direction (arrow F direction) from the first position. In addition, the non-driving side separating member 131 is in the state in which the movement in the second direction is regulated at the second position by the reverse-rotation preventing portion 131*e* in the state biased in the second direction (arow Q direction) by the elastic deformation portion 131*d*.

FIG. 12B is a state when the image forming apparatus 1 operates for the first time. The non-driving side separating member 131 has the engagement surface 131*c* (engaging portion), and the photosensitive drum 101 has the release projection 124*a* (engaged portion) capable of engagement with the engagement surface 131*c*. When the image forming apparatus 1 operates for the first time, the release projection 124*a* rotates while being engaged with the engagement surface 131*c*, whereby the non-driving side separating member 131 is rotated in the direction (arrow P direction) opposite to the second direction (arrow Q direction). When the non-driving side separating member 131 rotates to the position where the end part 131*h* of the elastic deformation portion 131*d* is separated from the inner wall 121*d* in the direction opposite to the second direction from the second position, the elastic deformation portion 131*d* is brought into a state of not being elastically deformed. At this time, the abutted portion 131*b* projects in a direction intersecting the first direction (F direction) and is not brought into contact with the surface of the photosensitive drum 101, and the photosensitive drum 101 and the charging roller 102 become capable of contact. A rotation angle from the state in FIG. 12A to the position where the end part 131*h* of the elastic deformation portion 131*d* is separated from the inner wall 121*d* is approximately 49 degrees in this Embodiment. Note that this angle is only exemplification and is determined in accordance with configurations of the non-driving side separating member 131 and the inner wall 121*d* of the frame body 121, and this angle is not limiting.

FIG. 12C is a state after the image forming apparatus 1 operates for the first time. The abutted portion 131*b* projects in the direction intersecting the first direction (arrow F direction), when the non-driving side separating member 131 rotates in the direction (arrow P direction) opposite to the second direction (arrow Q direction) from the second position to the position where the end part 131*h* of the elastic deformation portion 131*d* is separated from the inner wall 121*d*. At this time, the abutted portion 131*b* is not brought into contact with the surface of the photosensitive drum 101 in the state assembled to the charging unit 120, and the photosensitive drum 101 and the charging roller 102 are configured to contact. The elastic deformation portion 131*d* is configured so as not to bias the non-driving side separating member 131, when the non-driving side separating member 131 rotates from the second position in the direction (arrow P direction) opposite to the second direction (arrow Q direction) to the position where the end part 131*h* of the elastic deformation portion 131*d* is separated from the inner wall 121*d*.

In the state in FIG. 12C, the non-driving side charging-roller bearing 127*a* is at the position moved from the first position in the direction (arrow K direction) opposite to the first direction (arrow F direction) in the state biased in the first direction (arrow F direction) by the pressurizing spring 127*b*. In addition, the non-driving side separating member 131 is at the position rotated from the second position to the position where the end part 131*h* of the elastic deformation portion 131*d* is separated from the inner wall 121*d* in the direction (arrow P direction) opposite to the second direction in the state in which the biasing force by the elastic deformation portion 131*d* as the second biasing member is not generated.

Figure 13:
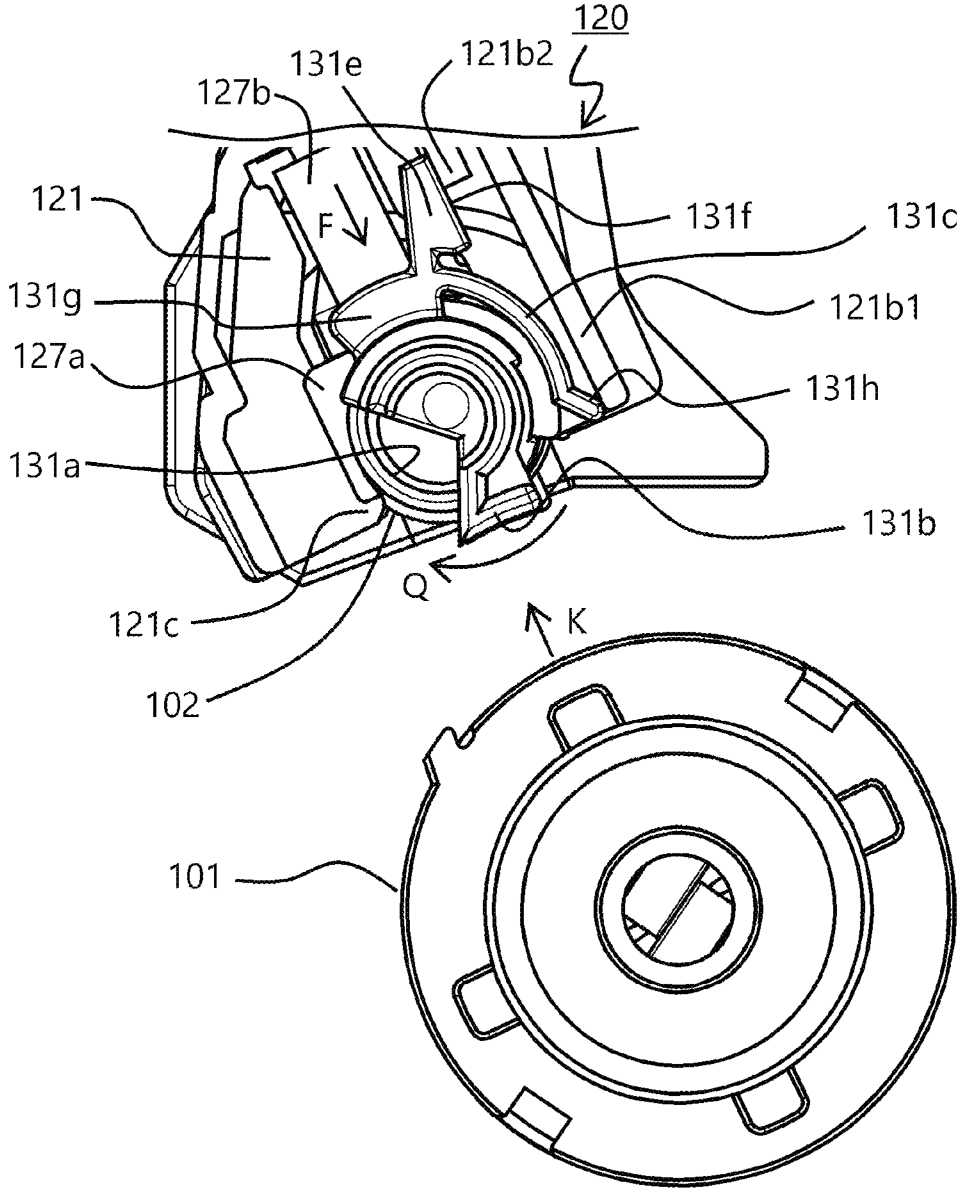
FIG. 13 is a partial side view of the non-driving side end part of the charging unit of the Embodiment 1.

Note that the wall portion 121*b* with which the elastic deformation portion 131*d* and the locking surface 131*f* are brought into contact does not necessarily have to be the same, but as shown in FIG. 13, for example, it may be so configured to be brought into contact with different wall portions 121*b*1, 121*b*2 of the frame body 121, respectively.

In addition, in the Embodiment 1, the wall portion 121*b* shown in FIG. 1 and the wall portions 121*b*1, 121*b*2 shown in FIG. 13 are provided in parallel to the first direction (arrow F direction), which is the moving direction of the charging roller 102, but this is not necessarily limiting. It is only necessary that contact by the elastic deformation portion 131*d*, while elastically deforming, can cause a force to rotate in the second direction (arrow Q direction) to act on the non-driving side separating member 131. In addition, it is only necessary that the contact by the locking surface 131*f* can regulate the rotation of the non-driving side separating member 131 in the second direction (arrow Q direction).

However, by providing the wall portions 121*b*, 121*b*1, 121*b*2 in parallel in the first direction (arrow F direction), which is the moving direction of the charging roller 102, a deformation amount of the elastic deformation portion 131*d* can be made constant regardless of the position of the charging roller 102. As a result, a force against the separation release generated by the force received by the elastic deformation portion 131*d* can be made stable.

Embodiment 2

An Embodiment 2 of the present invention will be explained by using FIG. 14.

Figure 14:
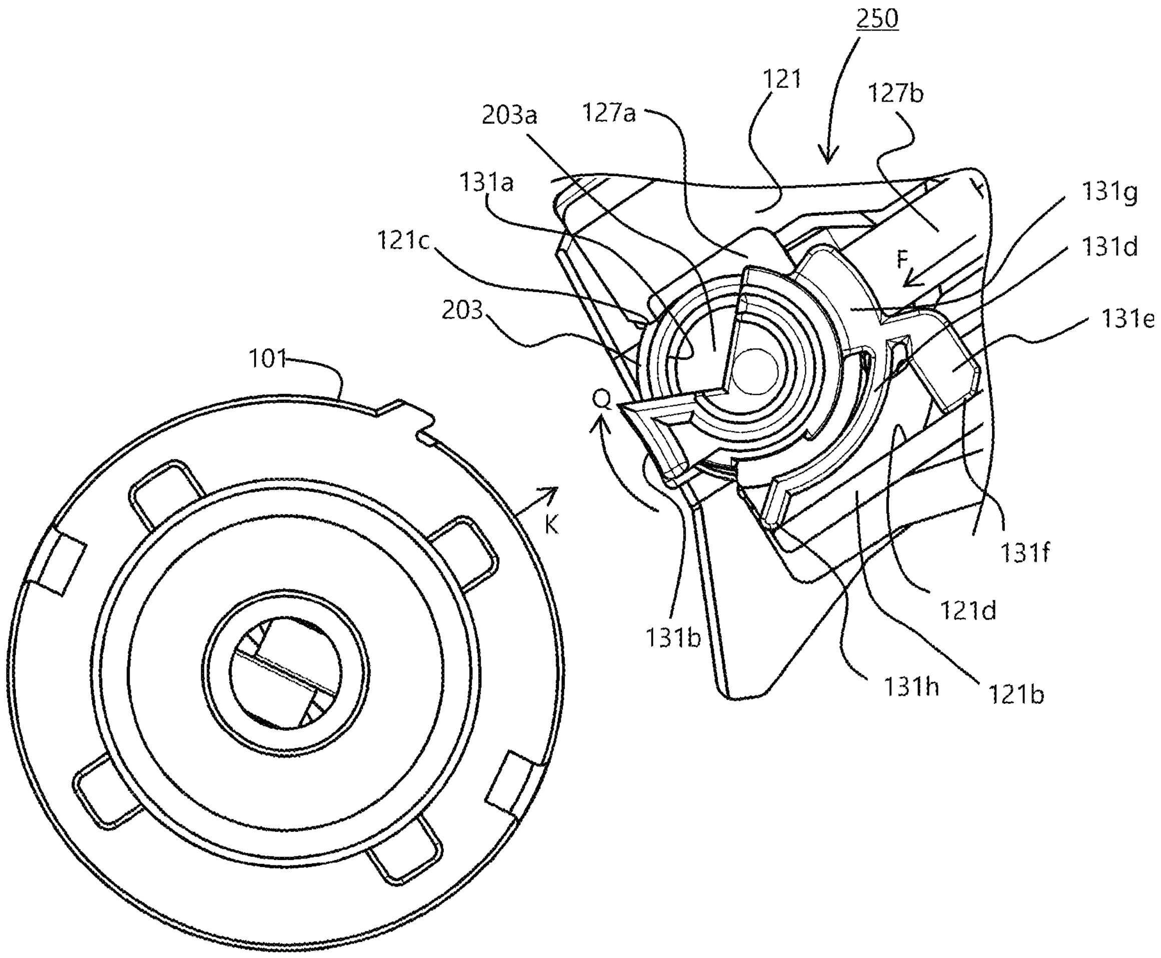
FIG. 14 is a partial side view of a non-driving side end part of a development unit of an Embodiment 2.

FIG. 14 is a partial side view of an end part of a development unit 250 in the state before the photosensitive drum is assembled according to the Embodiment 2. In the Embodiment 2, a development roller 203 for developing an electrostatic latent image formed on the photosensitive drum 101 as a toner image is made a roller member. The development roller 203 is an example of a roller member rotating in a state in contact with the photosensitive drum 101 at the image formation. Note that the Embodiment 2 is configured such that the charging roller 102 described in the Embodiment 1 is replaced with the development roller 203, while the other configurations are substantially similar to those of the Embodiment 1. Therefore, in the Embodiment 2, detailed explanation for the configurations similar to those in the above-described Embodiment 1 will be omitted by giving the same signs.

As shown in FIG. 14, the non-driving side separating member 131 is mounted by fitting the cylinder portion 131*a* with a shaft portion 203*a* of the development roller 203.

A separation configuration, a separation release configuration, and a separating-member holding configuration at the assembly of the development roller 203 are configurations similar to those in Embodiment 1.

Embodiment 3

An Embodiment 3 of the present invention will be explained by using FIG. 15.

Figure 15:
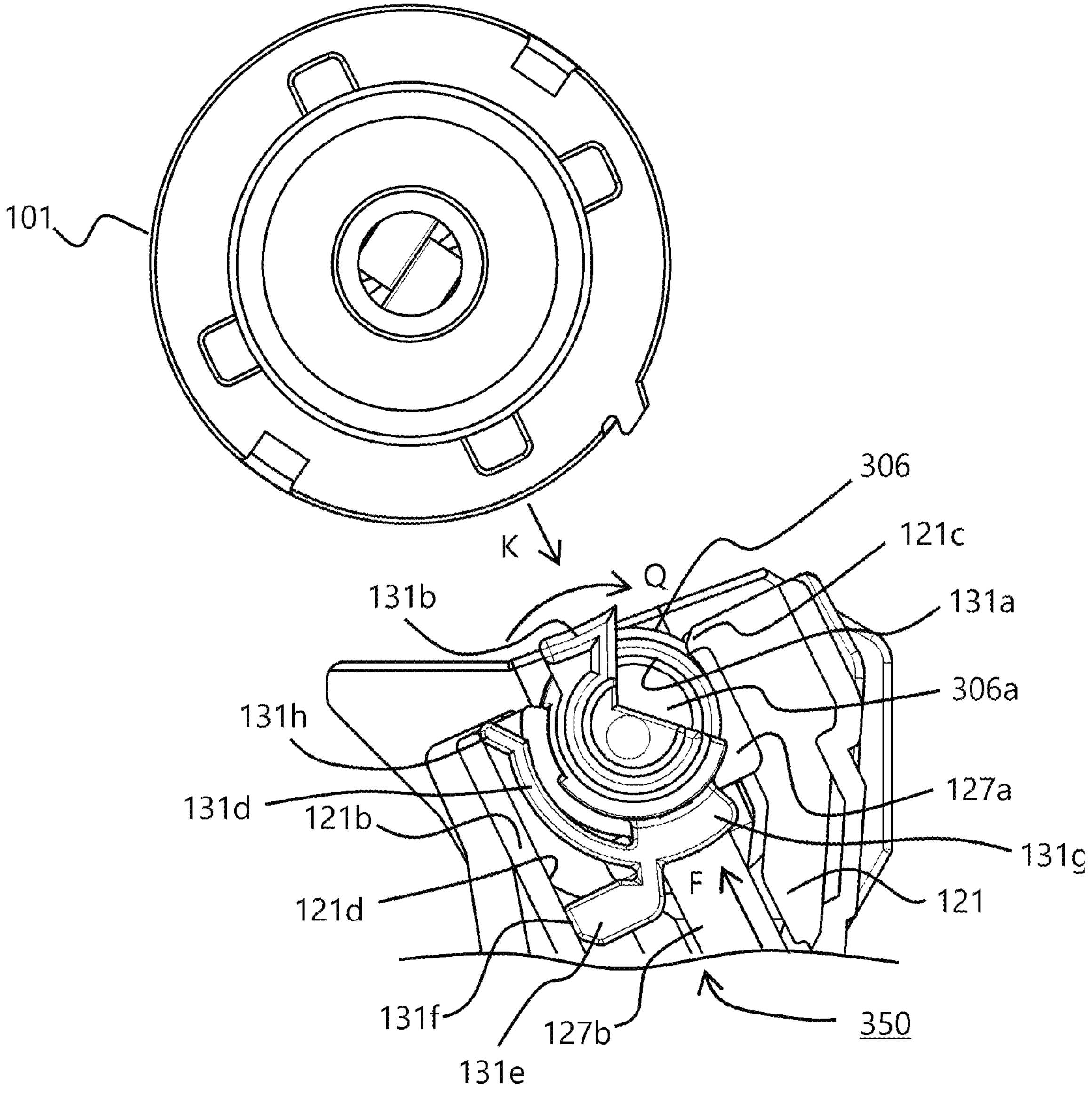
FIG. 15 is a partial side view of a non-driving side end part of a transfer unit of an Embodiment 3.

FIG. 15 is a partial side view of an end part of a transfer unit 350 according to the Embodiment 3, in a state before the photosensitive drum is assembled.

In the Embodiment 3, a transfer roller 306 for transferring a toner image (developer image) formed on the photosensitive drum 101 to the recording medium is a roller member. The transfer roller 306 is an example of the roller member rotated in a state in contact with the photosensitive drum 101 at the image formation. Note that, in the Embodiment 3, it is configured such that the charging roller 102 described in the Embodiment 1 is replaced by the transfer roller 306, while the other configurations are substantially similar to those in the Embodiment 1. Therefore, in the Embodiment 3, detailed explanation for the configurations similar to those in the above-described Embodiment 1 will be omitted by giving the same signs.

As shown in FIG. 15, the non-driving side separating member 131 is mounted by fitting the cylinder portion **131*a* with a shaft portion 306*a* of the transfer roller 306**.

The separation configuration, the separation release configuration, and the separating-member holding configuration at the assembly of the transfer roller 306 are substantially similar to those of the Embodiment 1.

In the above-described Embodiment, the configuration for holding the attitude of the separating member in the charging unit, the development unit, the transfer unit or the roller holding unit forming, when the photosensitive drum 101 is assembled thereto, a part of the process cartridge was explained. In the Embodiment 1, a part excluding the photosensitive drum 101 from the charging unit 120 is an example of the roller holding unit for holding the charging roller 102 as the roller member. In the Embodiment 2, a part excluding the photosensitive drum 101 from the development unit 250 is an example of the roller holding unit for holding the development roller 203 as the roller member. In the Embodiment 3, a part excluding the photosensitive drum 101 from the transfer unit 350 is an example of the roller holding unit for holding the transfer roller 306 as the roller member. The charging unit 120, the development unit 250, the transfer unit 350 may constitute such a cartridge that can be detachably attached to the image forming apparatus 1. In this case, a part excluding the photosensitive drum 101 from the cartridge is an example of the roller holding unit for holding the charging roller 102, the development roller 203, the transfer roller 306 as the roller members. The charging unit 120, the development unit 250, the transfer unit 350 may constitute a part of the image forming apparatus 1. In this case, a part excluding the photosensitive drum 101 from the image forming apparatus 1 is an example of the roller holding unit for holding the charging roller 102, the development roller 203, the transfer roller 306 as the roller members. That is, the attitude of the separating member in the state before the photosensitive drum is assembled can be held in the configuration similar to each of the above-described Embodiments even in the roller holding unit forming, when the photosensitive drum is assembled thereto, a part of the image forming apparatus.

In addition, the present invention can be understood as an image forming apparatus or a cartridge in which the photosensitive drum 101 is assembled to the roller holding unit as above. That is, the present invention includes the charging unit 120, the development unit 250, the transfer unit 350, the process cartridge 100, the image forming apparatus 1 as the roller holding unit in the state before the photosensitive drum 101 is assembled as shown in FIG. 1. In addition, the present invention includes the charging unit 120, the development unit 250, the transfer unit 350, the process cartridge 100, the image forming apparatus 1 as the roller holding unit in the state in which the photosensitive drum 101 is assembled as shown in FIG. 12A. In any one of the configurations, as explained in the above-described Embodiments, by providing the configuration of regulating the movement in the first direction and the configuration of regulating the movement in the second direction of the separating member, in the state before the photosensitive drum 101 is assembled, the attitude of the separating member can be maintained. In the state after the photosensitive drum 101 is assembled, holding is possible in the state in which the photosensitive drum 101 and the roller members (the charging roller 102, the development roller 203, the transfer roller 306) are separated. Therefore, workability in the process of assembling the photosensitive drum 101 to the roller holding unit (the charging unit 120, the development unit 250, the transfer unit 350, the process cartridge 100, the image forming apparatus 1) is improved. In addition, continuous contact between the photosensitive drum 101 and the roller members until an initial operation of the image forming apparatus 1 can be suppressed, whereby remaining of a contact trace can be suppressed.

According to the present disclosure, in the assembling process of assembling the photosensitive drum to the roller holding unit, the attitude of the separating member can be held toward the photosensitive drum in the state before the photosensitive drum is assembled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-057904, filed on Mar. 29, 2024, which is hereby incorporated by reference herein in its entirety.

What is claimed is:

1. A roller holding unit, when a photosensitive drum is assembled thereto, forming a part of an image forming apparatus or a part of a cartridge detachably attached to an apparatus main body of an image forming apparatus, comprising:

- a frame body;
- a roller member having a shaft portion and rotating in a state in contact with the photosensitive drum at image formation;
- a bearing member rotatably supporting the shaft portion and held by the frame body movably in a first direction perpendicular to a rotation axis of the shaft portion;
- a first biasing member for biasing the bearing member in the first direction with respect to the frame body;
- a first regulating member configured to regulate movement of the bearing member in the first direction from a first position, the first position being a position where the bearing member is positioned in a state where the photosensitive drum is not assembled to the roller holding unit;

a separating member rotatable around the shaft portion;

a second biasing member configured to bias the separating member in a second direction, which is a rotating direction around the shaft portion, with respect to the frame body; and a second regulating member configured to regulate rotation of the separating member in the second direction, wherein the separating member has a cylinder portion attached to an end part in an axial direction of the shaft portion and a projecting portion projecting in a radial direction of the shaft portion from the cylinder portion.

2. The roller holding unit according to claim 1, wherein the projecting portion is referred to as a first projecting portion, wherein the second biasing member has:

a second projecting portion projecting in a radial direction of the shaft portion from the cylinder portion of the separating member; and an arm portion extending along a circumferential direction of the cylinder portion from the second projecting portion with a clearance from a surface of the cylinder portion and elastically deformable in the radial direction, wherein a position where the separating member is positioned in a state where the photosensitive drum is not assembled to the roller holding unit is referred to as a second position, wherein a distance in the radial direction between the surface of the cylinder portion and an inner wall of the frame body facing the separating member in the state where the separating member is at the second position is smaller than a distance in the radial direction between the surface of the cylinder portion and an end part of the arm portion in a state where the arm portion is not elastically deformed, wherein the second biasing member is configured such that an elastic force biasing the separating member in the second direction is generated by the end part of the arm portion contacting with the inner wall of the frame body and the arm portion being elastically deformed radially inward in a case where the separating member is at the second position, wherein the second regulating member has a third projecting portion projecting from the second projecting portion of the separating member in a direction different from the direction in which the arm portion projects, wherein the second regulating member is configured to regulate rotation of the separating member in the second direction by the third projecting portion contacting with the inner wall of the frame body, wherein the first projecting portion projects in the first direction in a case where the separating member is at the second position, wherein the first projecting portion is configured such that the first projecting portion contacts with a surface of the photosensitive drum and a clearance can be formed between the photosensitive drum and the roller member in a case where the photosensitive drum is assembled to the roller holding unit, and wherein, in a state where the photosensitive drum is not assembled to the roller holding unit, the bearing member is in a state where the bearing member is biased in the first direction by the first biasing member and movement of the bearing member in the first direction is regulated at the first position by the first regulating member; and the separating member is in a state where the separating member is biased in the second direction by the second biasing member and movement of the separating member in the second direction is regulated at the second position by the second regulating member.

3. The roller holding unit according to claim 2, wherein, in a state after the photosensitive drum is assembled to the roller holding unit and before the image forming apparatus operates for the first time, the bearing member is at a position moved in a direction opposite to the first direction from the first position in a state where the bearing member is biased in the first direction by the first biasing member; and the separating member is in a state where the separating member is biased in the second direction by the second biasing member and movement of the separating member in the second direction is regulated at the second position by the second regulating member.

4. The roller holding unit according to claim 2, wherein the photosensitive drum and the roller member are configured to contact in a case where:

the separating member is rotated in a direction opposite to the second direction from the second position to a position where the end part of the arm portion of the second biasing member is separated from the inner wall of the frame body;

the arm portion is brought into a state not elastically deformed; and the first projecting portion projects in a direction intersecting the first direction and is brought into a state not in contact with a surface of the photosensitive drum assembled to the roller holding unit, wherein the separating member has an engaging portion, wherein the photosensitive drum has an engaged portion configured to be engaged with the engaging portion, wherein the separating member is rotated in the direction opposite to the second direction by the engaged portion being rotated while being engaged with the engaging portion in a case where the image forming apparatus operates for the first time, and wherein, in a state after the image forming apparatus operates for the first time, the bearing member is at a position moved in a direction opposite to the first direction from the first position in a state where the bearing member is biased in the first direction by the first biasing member; and the separating member is in a state where the separating member is not biased by the second biasing member and is at a position rotated in a direction opposite to the second direction from the second position where the end part of the arm portion of the second biasing member is separated from the inner wall of the frame body.

5. The roller holding unit according to claim 1, wherein the first biasing member is a spring provided between the bearing member and the frame body.

6. The roller holding unit according to claim 1, wherein the first regulating member is an engagement projection engaged with an end part in the first direction of the bearing member.

7. The roller holding unit according to claim 1, wherein the roller member is a charging roller that charges the photosensitive drum.

8. The roller holding unit according to claim 1, wherein the roller member is a development roller that develops an electrostatic latent image formed on the photosensitive drum as a toner image.

9. The roller holding unit according to claim 1, wherein the roller member is a transfer roller that transfers a toner image formed on the photosensitive drum to a recording medium.

10. An image forming apparatus, comprising:

a frame body;

a photosensitive drum;

a roller member having a shaft portion and rotating in a state in contact with the photosensitive drum at image formation;

a bearing member rotatably supporting the shaft portion and held by the frame body movably in a direction in which a distance between the bearing member and the photosensitive drum changes;

a first biasing member for biasing the bearing member in a first direction with respect to the frame body, the first direction being a direction in which the bearing member approaches the photosensitive drum;

a first regulating member configured to regulate movement of the bearing member in the first direction from a first position, the first position being a position where the bearing member is positioned in a state where the photosensitive drum is not assembled to the image forming apparatus;

a separating member rotatable around the shaft portion;

a second biasing member configured to bias the separating member in a second direction, which is a rotating direction around the shaft portion, with respect to the frame body; and a second regulating member configured to regulate rotation of the separating member in the second direction, wherein the separating member has a cylinder portion attached to an end part in an axial direction of the shaft portion and a projecting portion projecting in a radial direction of the shaft portion from the cylinder portion.

11. The image forming apparatus according to claim 10, wherein the projecting portion is referred to as a first projecting portion, wherein the second biasing member has:

a second projecting portion projecting in a radial direction of the shaft portion from the cylinder portion of the separating member; and an arm portion extending along a circumferential direction of the cylinder portion from the second projecting portion with a clearance from a surface of the cylinder portion and elastically deformable in the radial direction, wherein a position where the separating member is positioned in a state where the photosensitive drum is not assembled to the image forming apparatus is referred to as a second position, wherein a distance in the radial direction between the surface of the cylinder portion and an inner wall of the frame body facing the separating member in the state where the separating member is at the second position is smaller than a distance in the radial direction between the surface of the cylinder portion and an end part of the arm portion in a state where the arm portion is not elastically deformed, wherein the second biasing member is configured such that an elastic force biasing the separating member in the second direction is generated by the end part of the arm portion contacting with the inner wall of the frame body and the arm portion being elastically deformed radially inward in a case where the separating member is at the second position, wherein the second regulating member has a third projecting portion projecting from the second projecting portion of the separating member in a direction different from the direction in which the arm portion projects, wherein the second regulating member is configured to regulate rotation of the separating member in the second direction by the third projecting portion contacting with the inner wall of the frame body, wherein the first projecting portion projects in the first direction in a case where the separating member is at the second position, wherein the first projecting portion is configured such that the first projecting portion contacts with a surface of the photosensitive drum and a clearance can be formed between the photosensitive drum and the roller member, and wherein, in a state before the image forming apparatus operates for the first time, the bearing member is at a position moved from the first direction in a direction opposite to the first direction in a state where the bearing member is biased in the first direction by the first biasing member; and the separating member is in a state where the separating member is biased in the second direction by the second biasing member and movement of the separating member in the second direction is regulated at the second position by the second regulating member.

12. The image forming apparatus according to claim 11, wherein the photosensitive drum and the roller member are configured to contact in a case where:

the separating member is rotated in a direction opposite to the second direction from the second position to a position where the end part of the arm portion of the second biasing member is separated from the inner wall of the frame body;

the arm portion is brought into a state not elastically deformed; and the first projecting portion projects in a direction intersecting the first direction and is brought into a state not in contact with a surface of the photosensitive drum, wherein the separating member has an engaging portion, wherein the photosensitive drum has an engaged portion configured to be engaged with the engaging portion, wherein the separating member is rotated in the direction opposite to the second direction by the engaged portion being rotated while being engaged with the engaging portion in a case where the image forming apparatus operates for the first time, and wherein, in a state after the image forming apparatus operates for the first time, the bearing member is at a position moved in a direction opposite to the first direction from the first position in a state where the bearing member is biased in the first direction by the first biasing member; and the separating member is in a state where the separating member is not biased by the second biasing member and is at a position rotated in a direction opposite to the second direction from the second position where the end part of the arm portion of the second biasing member is separated from the inner wall of the frame body.

13. A cartridge configured to be detachably attached to an apparatus main body of an image forming apparatus, comprising:

a frame body;

a photosensitive drum;

a roller member having a shaft portion and rotating in a state in contact with the photosensitive drum at image formation;

a bearing member rotatably supporting the shaft portion and held by the frame body movably in a direction in which a distance between the bearing member and the photosensitive drum changes;

a first biasing member for biasing the bearing member in a first direction with respect to the frame body, the first direction being a direction in which the bearing member approaches the photosensitive drum;

a first regulating member configured to regulate movement of the bearing member in the first direction from a first position, the first position being a position where the bearing member is positioned in a state where the photosensitive drum is not assembled to the cartridge;

a separating member rotatable around the shaft portion;

a second biasing member configured to bias the separating member in a second direction, which is a rotating direction around the shaft portion, with respect to the frame body; and a second regulating member configured to regulate rotation of the separating member in the second direction, wherein the separating member has a cylinder portion attached to an end part in an axial direction of the shaft portion and a projecting portion projecting in a radial direction of the shaft portion from the cylinder portion.

14. The cartridge according to claim 13, wherein the projecting portion is referred to as a first projecting portion, wherein the second biasing member has:

a second projecting portion projecting in a radial direction of the shaft portion from the cylinder portion of the separating member; and an arm portion extending along a circumferential direction of the cylinder portion from the second projecting portion with a clearance from a surface of the cylinder portion and elastically deformable in the radial direction, wherein a position where the separating member is positioned in a state where the photosensitive drum is not assembled to the cartridge is referred to as a second position, wherein a distance in the radial direction between the surface of the cylinder portion and an inner wall of the frame body facing the separating member in the state where the separating member is at the second position is smaller than a distance in the radial direction between the surface of the cylinder portion and an end part of the arm portion in a state where the arm portion is not elastically deformed, wherein the second biasing member is configured such that an elastic force biasing the separating member in the second direction is generated by the end part of the arm portion contacting with the inner wall of the frame body and the arm portion being elastically deformed radially inward in a case where the separating member is at the second position, wherein the second regulating member has a third projecting portion projecting from the cylinder portion of the separating member in a direction different from the direction in which the second projecting portion projects in a radial direction of the shaft portion, and wherein the second regulating member is configured to regulate rotation of the separating member in the second direction by the third projecting portion contacting with the inner wall of the frame body, wherein the first projecting portion projects in the first direction in a case where the separating member is at the second position, wherein the first projecting portion is configured such that the first projecting portion contacts with a surface of the photosensitive drum and a clearance can be formed between the photosensitive drum and the roller member, and wherein, in a state before the cartridge attached to the apparatus main body operates for the first time, the bearing member is at a position moved from the first direction in a direction opposite to the first direction in a state where the bearing member is biased in the first direction by the first biasing member; and the separating member is in a state where the separating member is biased in the second direction by the second biasing member and movement of the separating member in the second direction is regulated at the second position by the second regulating member.

15. The cartridge according to claim 14, wherein the photosensitive drum and the roller member are configured to contact in a case where:

the separating member is rotated in a direction opposite to the second direction from the second position to a position where the end part of the arm portion of the second biasing member is separated from the inner wall of the frame body;

the arm portion is brought into a state not elastically deformed; and the first projecting portion projects in a direction intersecting the first direction and is brought into a state not in contact with a surface of the photosensitive drum, wherein the separating member has an engaging portion, wherein the photosensitive drum has an engaged portion configured to be engaged with the engaging portion, wherein the separating member is rotated in the direction opposite to the second direction by the engaged portion being rotated while being engaged with the engaging portion in a case where the image forming apparatus operates for the first time, and wherein, in a state after the cartridge attached to the apparatus main body operates for the first time, the bearing member is at a position moved in a direction opposite to the first direction from the first position in a state where the bearing member is biased in the first direction by the first biasing member; and the separating member is in a state where the separating member is not biased by the second biasing member and is at a position rotated in a direction opposite to the second direction from the second position where the end part of the arm portion of the second biasing member is separated from the inner wall of the frame body.

* * * * *